US008448616B2

(12) United States Patent
Kirk

(10) Patent No.: US 8,448,616 B2
(45) Date of Patent: May 28, 2013

(54) INTERNAL COMBUSTION ENGINE CYCLE

(75) Inventor: William H. Kirk, Royal Oak, MI (US)

(73) Assignee: Turbo Innovation, LLC, Madison Heights, MI (US)

( * ) Notice: Subject to any disclaimer, the term of this patent is extended or adjusted under 35 U.S.C. 154(b) by 506 days.

(21) Appl. No.: 12/692,250

(22) Filed: Jan. 22, 2010

(65) Prior Publication Data

US 2010/0191442 A1 Jul. 29, 2010

Related U.S. Application Data

(60) Provisional application No. 61/205,924, filed on Jan. 23, 2009.

(51) Int. Cl.
*F01L 1/34* (2006.01)
*F02B 33/00* (2006.01)
*F02B 33/44* (2006.01)

(52) U.S. Cl.
USPC ............ 123/90.15; 123/432; 123/559.1; 60/605.2; 60/612

(58) Field of Classification Search
USPC ........... 123/90.15, 90.16, 559.1, 562, 568.14, 123/316, 308, 432; 60/600, 605.1, 605.2, 60/612
See application file for complete search history.

(56) References Cited

U.S. PATENT DOCUMENTS

| | | | |
|---|---|---|---|
| 2,670,595 A | | 3/1954 | Miller |
| 2,773,490 A | * | 12/1956 | Miller ........................ 123/316 |
| 2,780,912 A | | 2/1957 | Miller |
| 3,015,934 A | | 1/1962 | Miller |
| 3,029,594 A | | 4/1962 | Miller |
| 3,186,388 A | * | 6/1965 | Bricout ........................ 123/432 |
| 4,339,922 A | | 7/1982 | Navarro |

(Continued)

OTHER PUBLICATIONS

Miller, R., "Nordberg Supairthermal Diesel, Duafuel and Gas Engines Operating on the Miller Supercharging System", Petroleum Division Conference, ASME, Sep. 1951.

(Continued)

*Primary Examiner* — Thomas Moulis
(74) *Attorney, Agent, or Firm* — Howard & Howard Attorneys PLLC

(57) ABSTRACT

An internal combustion engine including an air intake pressurization device having an outlet from which air at a pressure substantially greater than ambient air pressure is expelled, an expansible combustion chamber into which air is received from the device outlet and from which exhaust gases are expelled, first and second intake valves and one or more exhaust valves, each valve having open and closed states. The combustion chamber is in periodic fluid communication with the device outlet through at least one of the first and second intake valves, and exhaust gases are expelled from the combustion chamber via the exhaust valve(s). A control valve disposed between the first intake valve and the device outlet has an open position in which the device outlet and the combustion chamber are in fluid communication via the first intake valve in its open state, and a closed position in which fluid communication between the device outlet and the combustion chamber via the first intake valve is comparatively restricted. The exhaust valve(s) is in its open state when the first and second intake valves are both in their closed states, the first and second intake valves are both in their open states when the exhaust valve(s) is in its closed state, and the second intake valve is moved from its open state into its closed state substantially prior to movement of the first intake valve from its open state into its closed state.

52 Claims, 13 Drawing Sheets

U.S. PATENT DOCUMENTS

| | | | |
|---|---|---|---|
| 4,488,531 A * | 12/1984 | Tadokoro et al. | 123/559.1 |
| 4,538,574 A | 9/1985 | Lombardi | |
| 4,541,372 A | 9/1985 | Weiss | |
| 4,548,175 A | 10/1985 | Kawai et al. | |
| 4,566,422 A * | 1/1986 | Tadokoro et al. | 123/559.1 |
| 4,570,590 A | 2/1986 | Kawai et al. | |
| 4,628,880 A * | 12/1986 | Aoyama et al. | 123/432 |
| 4,669,434 A * | 6/1987 | Okumura et al. | 123/308 |
| 4,703,734 A * | 11/1987 | Aoyama et al. | 123/432 |
| 4,727,719 A * | 3/1988 | Mizutani | 60/611 |
| 4,809,649 A * | 3/1989 | Brinkman | 123/76 |
| 4,852,353 A | 8/1989 | Holmer | |
| 4,860,709 A * | 8/1989 | Clarke et al. | 123/432 |
| 4,893,474 A | 1/1990 | Miller et al. | |
| 4,916,903 A | 4/1990 | Holmer | |
| 4,959,961 A * | 10/1990 | Hiereth | 60/612 |
| 4,998,513 A * | 3/1991 | Gagnon | 123/76 |
| 5,025,629 A | 6/1991 | Woollenweber | |
| 6,279,550 B1 | 8/2001 | Bryant | |
| 6,343,473 B1 | 2/2002 | Kanesaka | |
| 6,470,681 B1 * | 10/2002 | Orton | 60/605.1 |
| 6,474,323 B1 | 11/2002 | Beck et al. | |
| 6,484,500 B1 | 11/2002 | Coleman et al. | |
| 6,772,742 B2 | 8/2004 | Lei et al. | |
| 6,951,211 B2 | 10/2005 | Bryant | |
| 7,201,121 B2 | 4/2007 | Weber et al. | |
| 7,222,614 B2 | 5/2007 | Bryant | |
| 7,252,054 B2 | 8/2007 | Weber et al. | |
| 7,275,516 B1 * | 10/2007 | Cunningham et al. | 123/305 |
| 7,281,527 B1 | 10/2007 | Bryant | |
| 7,380,525 B2 * | 6/2008 | Ma et al. | 123/48 D |
| 7,490,594 B2 | 2/2009 | Van Dyne et al. | |
| 7,587,898 B2 * | 9/2009 | Turner | 60/612 |
| 7,730,874 B2 * | 6/2010 | Leduc et al. | 123/432 |
| 7,980,220 B2 * | 7/2011 | Boyer et al. | 123/432 |
| 2003/0079702 A1 | 5/2003 | Phlips | |
| 2004/0094117 A1 * | 5/2004 | Widener et al. | 123/279 |
| 2006/0021606 A1 | 2/2006 | Bryant | |
| 2007/0062188 A1 | 3/2007 | Fry et al. | |
| 2007/0119168 A1 | 5/2007 | Turner | |
| 2007/0220884 A1 | 9/2007 | Savage, Jr. et al. | |
| 2008/0196409 A1 | 8/2008 | Goebelbecker et al. | |
| 2009/0007563 A1 | 1/2009 | Cooper et al. | |
| 2009/0013945 A1 | 1/2009 | Buckland et al. | |
| 2009/0018751 A1 | 1/2009 | Buckland et al. | |
| 2009/0120087 A1 | 5/2009 | Sumser et al. | |
| 2009/0211245 A1 | 8/2009 | McEwan et al. | |
| 2009/0211246 A1 | 8/2009 | McEwan et al. | |
| 2009/0211247 A1 | 8/2009 | McEwan et al. | |
| 2011/0315101 A1 * | 12/2011 | Cleary et al. | 123/90.15 |
| 2012/0023935 A1 * | 2/2012 | Pursifull et al. | 60/605.2 |

OTHER PUBLICATIONS

Meier, E. and Baden, "The Miller System—a Possible Solution to Present Problems With Highly Charged Four-Stroke Engines", Brown Boveri Review, Apr. 1977, pp. 235-242, vol. 64, No. 4.

"Two-Stage Turbocharging for GMT's B230 High Speed Engine", The Motor Ship, Sep. 1978, pp. 27-32, 67-68.

Zappa, G. and Franca, T., "A 4-Stroke High Speed Diesel Engine With Two-Stage of Supercharging and Variable Compression Ratio", 13th International Congress on Combustion Engines, 1979, pp. D-19-1-D-19-22.

Charlton, S. et al., "Application of Variable Valve Timing to a Highly Turbocharged Diesel Engine", C405/044, IMechE, 1990, pp. 189-195.

Zhang, F. et al., "Effect of Miller Cycle on Gas Engine for Generation", JSAE Spring Convention, Jan. 1996, vol. 27, No. 1, pp. 79-83.

Suzuki, T. and Watanabe, H., "Application of a Miller System to a Diesel Engine", Nov. 1991, Paper No. 912183, pp. 2.13-2.16.

Bolton, B. and Assanis, D., "Optimum Breathing Strategies for Turbocharged Diesel Engines Based on the Miller Cycle Concept", American Society of Mechanical Engineers, Petroleum Division, Engineering Systems Design and Analysis, ASME, 1994, pp. 253-262, vol. 8, Part B.

Haugen, D., "Performance and Combustion Effects of Phased Late Intake Valve Closure on a Two Intake Valve Engine", A Thesis Submitted to the Faculty of the Graduate School of the University of Minnesota, Dec. 1995, pp. 1-84.

Search Report and Written Opinion dated Mar. 26, 2000 in counterpart PCT International Application No. PCT/US10/21806.

* cited by examiner

INTERNAL COMBUSTION ENGINE CYCLE

CROSS-REFERENCE TO RELATED APPLICATION

This application claims priority to U.S. Provisional Patent Application having Ser. No. 61/205,924 filed on Jan. 23, 2009, the entire disclosure of which is expressly incorporated herein by reference.

BACKGROUND OF THE INVENTION

1. Field of the Invention

The present invention relates generally to internal combustion engines and more particularly to combustion chamber intake valve arrangements, intake strokes and timing sequences therefor.

2. Description of the Related Art

Boosting the pressure of air introduced into an engine combustion chamber, by turbocharging for example, as a means of increasing engine shaft output has been known for many years. Turbocharging can also be used to improve fuel economy.

With turbocharging, the energy in engine exhaust gases is converted to power by the turbo machine's turbine. This power is mostly absorbed by the machine's compressor and reappears as boosted compressor outlet air pressure and increased mass airflow. Maximum compressor outlet air pressure is limited by compressor wheel design, generally in the range of a 2:1 pressure ratio between compressor outlet and compressor inlet pressures. At any given realized pressure ratio below this limit, the quantity of air delivered by the compressor is adjusted to correspond to the power supplied to it by the turbine. Assuming two stages of compression and the same available exhaust energy, the volume of air will be reduced in proportion to increased overall pressure ratio. Since two stages of compression can together provide nearly a 4:1 pressure ratio, air volume must be nearly halved.

In FIG. 1 the engine shaft output curve 20 and the turbo ideal power curve 22 cross at only one point. If the solid turbo power curve 22 of FIG. 1 represents best efficiency, the dashed curve 24 might represent five percent less efficient operation. The points 26, 28 at which the engine curve 20 and turbo curves 22, 24 cross are called the match points, and represent the powers and speeds at which the engine/turbo combinations should operate. Turbochargers are not constrained to operate along a fixed curve, but may have an infinite number of operating points within a range called a "map". This map will show all of the possible operating points for a turbine or a compressor and will specify the operating efficiencies for these points.

Turbocharging has proven especially useful in steady state applications where engines need to run for long periods at or near their rated outputs at constant RPM. In the past, large diesel engines were routinely used for large powerplant and stationary purposes, such as pumping and electric generation, before being displaced by gas turbines. These large engine turbos could be matched at or near their best operating efficiencies since these engines operated at or near constant RPM/power settings. Turbochargers were also routinely used on these large engines to improve fuel efficiencies.

In other applications such as automotive, in which the engine speed and load typically varies considerably during operation, turbocharging has more limited value due to the difficulties of matching the characteristics of piston engines and turbochargers. Vehicle engines also work under widely varying load conditions, making it difficult to "match" a turbocharger to such an engine. The turbo can adapt to a range of engine operation conditions, but this range can be quite narrow. Consequently, automotive turbo use has been generally limited to applications with narrower power requirements (e.g., racing, tractor, or heavy truck applications) where it is easier to adapt to the turbo's limited range. In the case of regular vehicles such as passenger cars, turbos have been matched to the engine at less than full power output in order to mitigate turbo lag and provide a more useable combination. In the latter case, and often in the former, exhaust at full power must bypass the turbine to prevent damage from overspeeding the turbocharger or over-charging the engine cylinder. This bypass is accomplished through an exhaust "wastegate" which diverts at least a portion of the exhaust gases exiting the combustion chamber away from the turbine inlet, thereby limiting the power put into compressing the intake air.

FIG. 1 discussed above shows the generalized relationship between engine output and turbocharger reaction when these two devices are mated together. This figure is included to illustrate the real incompatibility between these two device types and why wastegates have traditionally been used to assist in matching and minimizing turbo lag problems. FIG. 1 illustrates the typical characteristics of a reciprocating engine, such as used in vehicles and other prime mover applications, and rotating machines such as aircraft gas turbines and of course, turbochargers. The rapidly rising engine power curve 20 is typical of the shape of horsepower and torque curves for reciprocating engines. As you step on the accelerator of your car, it moves out in direct response to this curve. When you reach the top of this curve, your car can no longer accelerate or travel faster. The discarded exhaust energy very much follows the same trend.

A turbine machine, if it were installed in your car, would react quite differently, if you were to "floor" the accelerator on a gas turbine, the whole machine would simply quit, described in gas turbine parlance as a "flame-out". A gas turbine can supply air only by turning faster, and flooring the accelerator results in introducing far more fuel than can be burned with the air available at that instant. Had you depressed the accelerator only a little and waited for the machine to spin up, supplying more air, and followed that routine up to full throttle, you would likely have been successful in avoiding flameout. This process results in the curves 22, 24 of FIG. 1, which indicate turbo power. Turbochargers, being turbine-type machinery react similarly, except of course, they don't flame out. When you "floor" a turbocharged reciprocating engine, you initially get the full response of the engine only, with no turbo boost, since the turbo cannot respond quickly. After a few seconds, as the turbo begins to spin up, and the engine power increases more rapidly with greater turbine speed.

This inherent incompatibility between reciprocating engines and turbos results in so called "turbo lag" and other inter-operability difficulties. Turbo lag refers to the slow response of a turbocharger to sudden application of engine load. In a vehicle application, acceleration from a stop can create the sudden load change that leads to turbo lag. In present day applications, automotive engines are often equipped with two turbochargers to solve this problem. The smaller turbo machines in these applications have smaller rotating inertias, and consequently accelerate or "spool up" quicker and develop compressor pressures faster.

In a normal IC engine such as a diesel or spark ignition gasoline engine, cycle efficiency (and thus fuel consumption) is highly influenced by compression ratio. The higher the ratio, the better the efficiency. Diesels are known to be fuel efficient because they run at design compression ratio continuously. Spark ignition gasoline engines are throttled types and run at or near their design compression ratios only at wide open throttle. Gasoline engines in automotive use rarely run at wide open throttle, and consequently operate predominantly at low and inefficient real compression ratios. Therefore, modern gasoline engines are designed with the highest possible mechanical or design compression ratios, knowing that these engines operate at wide open throttle and full compression ratio for only very short time periods. Spark ignition timing can be temporarily retarded for these short periods to prevent detonation while more normal throttle settings yield engine operation with somewhat improved (i.e., lower) realized compression ratios as a result.

One method used to improve Otto cycle efficiency is the Miller cycle in which inlet valve timing is modified to delay the closing of the intake valve until well into the compression stroke. During the compression stroke in the Miller cycle, air introduced into the combustion chamber during the preceding intake stroke is expelled back into the engine's intake manifold by the rising piston via the late-closing intake valve. Thus, actual compression work done by the piston, and performed only after the intake valve closes, occurs later in the compression stroke than in other Otto cycle engines. Since the amount of air trapped in the cylinder is also reduced by the late-closing intake valve of the Miller cycle, intake air pressure boosting with, for example, turbocharging, can replace this air loss without exceeding engine mechanical design limits.

Furthermore, supercharging or turbocharging high design ratio gasoline engines risks pushing the real or operational compression ratio beyond safe limits at wide open throttle. In practice, with turbocharging, compromise can be reached by lowering the design compression ratio and routing excess exhaust gases around the turbo with a wastegate, as described above.

An improved internal combustion cycle that promotes greater efficiencies than realized in prior engines, and avoids problems associated with cylinder overpressurization in engines where intake air pressure is substantially boosted relative to ambient pressure is highly desirable. Moreover, it would be desirable to facilitate such improvements in existing IC engines without extensive modification.

SUMMARY OF THE INVENTION

The present invention provides a unique combustion chamber fluid flow valve timing schema for internal combustion engines having boosted intake air pressures. In this embodiment, the fuel efficiency of an engine is improved by converting the exhaust energy to mechanical shaft work by means of highly compressed air furnished, for example, by two turbocharger compressors connected in series. This compressed air returns power to the engine during the intake stroke. Overpressurization of the engine combustion chamber is prevented by controlling the quantity and timing of air introduced into the combustion chamber during the intake stroke. The methodology to be used combines this very high cylinder inlet air pressure with a modification of inlet valve arrangement and timing. Application of the present invention can be made to gasoline, multifuel, biofuel and diesel engines or any other type of alternately fueled internal combustion engine. The nature of this application lends itself to four stroke cycle engines but does not preclude any engine that can accommodate the valve arrangement and timing in accordance with the present invention. Moreover, in some cases the modification can be accommodated in existing multi-intake valve engines without substantial changes to the basic engine configuration.

The present invention includes a device for delivering air at a sufficiently high intake pressure to the combustion chamber. Exemplary embodiments of the present invention described herein employ a turbocharger for boosting the intake pressure, relative to ambient. The turbocharger described herein may be configured to include a plurality of ordinary turbochargers whose compressors are serially connected, or a single specialty turbocharger that delivers a high output air pressure as might be obtained with, for example, the serial connection of two turbo compressors, which is otherwise known as two stage compression. It is to be understood, however, that the device for delivering high pressure intake air need not be any type of turbocharger, or plurality of such turbochargers. It is envisioned, for example, that such devices may include any alternative machine that can convert lost heat energy to useable intake air power.

The present invention includes at least two engine cylinder intake valves, one of which is paired with a relatively low pressure control valve that is separately controlled. The control valve may be, for example, a butterfly valve. The cylinder also includes at least one exhaust valve.

According to a preferred embodiment of the present invention which facilitates its adaptation to existing multi-valve engines, each cylinder has four valves, each of which is cam-driven in a manner well-understood by one of ordinary skill in the art. Two of these four valves are normally classified as engine cylinder exhaust valves, which operate in a normal manner, and perhaps substantially identically in unison. The other two of these four valves are normally classified as engine cylinder intake valves and are referred to herein separately as the "normal" intake valve, which is generally configured and operated, relative to the engine cylinder head, the associated piston, and the exhaust valve(s), in a manner well-understood in the art; and the "auxiliary" intake valve, the open duration of which may be initiated substantially at or near the time the normal intake valve opens, but which closes substantially before the end of the normal intake valve open duration. The control valve is preferably disposed immediately upstream of the normal intake valve and variably positioned between an open position in which the incoming air is permitted to flow to the combustion chamber via its open normal intake valve, and a closed position in which the flow of incoming air to the combustion chamber via the normal intake valve is substantially restricted and the incoming air is permitted to flow to the combustion chamber only via its open auxiliary intake valve. The early closing of the auxiliary intake valve, relative to the normal intake valve, limits the amount of high pressure air introduced to the combustion chamber when the control valve is closed, thereby preventing overpressurization of the cylinder chamber, and permitting operation at or near the design compression ratio with the nominally operating normal intake valve effectively rendered inoperable.

It is envisioned that the auxiliary intake valve may alternatively be operated by other than a cam-drive arrangement. For example, it may be opened and closed by a solenoid, and controlled electronically by an engine control module or unit.

Similarly, it is envisioned that the control valve may be controlled by the engine control unit through an actuator, such as a stepper motor, responsive to sensed engine values relating to engine output, such as, for example, cylinder peak pressure. The control valve is preferably moved towards its closed position with increasing engine output, and is fully in its closed position at maximum engine output which, in a Diesel cycle engine is typically associated with high rates of fuel injection, and in an Otto cycle engine typically corresponds to a wide-open-throttle condition. The throttle valve in Otto cycle engine embodiments, which regulates the flow of intake air, can be located in any of several various desirable locations in the engine's air induction system. It is envisioned, for example, that the general location, structure and operation of the throttle valve of a gasoline engine to which the present invention is adapted may remain substantially unchanged.

During the intake stroke, with the intake valve(s) open, the boosted intake air received in the cylinder from the intake manifold acts on the piston face to force the piston away from the cylinder head and toward its bottom dead center position. This action of the highly pressurized air on the piston effectively makes the intake stroke a power stroke that drives the piston, and thus the crankshaft.

In accordance with the present invention, the quantity of boosted air to be introduced to the cylinder is controlled by altering at least the auxiliary intake valve open duration and, using the control valve, metering the flow past at least the normal intake valve, to avoid an excessive air charge being trapped in the cylinder during the compression stroke, and consequently excessive pressures and temperatures during the subsequent power stroke. The metering of the airflow past at least the normal intake valve is accomplished, under high engine output conditions, by rendering the still periodically opening normal intake valve effectively inoperable by closing the control valve, which prevents intake air from entering the cylinder via the normal intake valve, and closing the auxiliary intake valve during the intake stroke and substantially before the closing of the normal intake valve.

Further, with the control valve in its closed position, and subsequent to the closing of the auxiliary intake valve, the expansion of the high-pressure intake air charge contained in the closed combustion chamber assists in forcing the piston downward toward bottom dead center during the latter portion of the piston's intake stroke, which contributes to recovery of the energy expended in compressing the intake air charge.

By use of the present invention, the air charge contained in the cylinder under high engine output conditions can be controlled to desirable pressure and temperature levels at the beginning of the compression stroke, regardless of the boost pressure being substantially higher than in prior turbocharged engines. Thus, a beneficial amount of pumping work can be recovered from the exhaust gases, which is primarily manifested as the effective power stroke realized during the initial portion of the intake stroke, while limiting the pressure and temperature parameters of the resulting quantity of air trapped in the cylinder during the compression stroke. Cylinder pressure and temperature conditions at bottom dead center may, for example, be made equivalent to those experienced in an otherwise similar prior engine running at a substantially lower intake air boost level.

Thus, the present invention facilitates substantial fuel efficiency gains that can be made through: converting exhaust energy into useable work, with high pressure air acting on the engine pistons; regulating cylinder pressures so that the more efficient higher design compression ratios can be maintained and efficiently utilized; allowing the use of smaller displacement engines for the same power requirements, along with their inherent fuel efficient characteristics; reducing lag tendencies inherent in single turbo applications; and/or providing a means for improving turbo-to-engine matching, resulting in better overall engine response characteristics and turbo utilization.

The present invention provides an internal combustion engine including an air intake pressurization device having an outlet from which air at a pressure substantially greater than ambient air pressure is expelled, an expansible combustion chamber into which air is received from the air intake pressurization device outlet and from which exhaust gases are expelled, and a plurality of fluid flow valves each having open and closed states relative to the combustion chamber and including first and second intake valves and one or more exhaust valves. The combustion chamber is in periodic fluid communication with the air intake pressurization device outlet through at least one of the first and second intake valves, and exhaust gases are expelled from the combustion chamber via the exhaust valve(s). A control valve is disposed between the first intake valve and the air intake pressurization device outlet. The control valve has an open position in which the air intake pressurization device outlet and the combustion chamber are in fluid communication via the first intake valve in its open state. The control valve also has a closed position in which fluid communication between the air intake pressurization device outlet and the combustion chamber via the first intake valve in its open state is comparatively restricted. The exhaust valve(s) is in its open state when the first and second intake valves are both in their closed states, the first and second intake valves are both in their open states when the exhaust valve(s) is in its closed state, and the second intake valve is moved from its open state into its closed state substantially prior to movement of the first intake valve from its open state into its closed state.

The present invention also provides a method for performing the operating cycle of an internal combustion engine including the steps of: supplying intake air at a pressure substantially greater than ambient air pressure to an intake manifold in periodic fluid communication with a combustion chamber; opening first and second intake valves substantially simultaneously and placing the intake manifold and combustion chamber in fluid communication; receiving intake air from the intake manifold into the combustion chamber via at least one of the first and second intake valves; moving a piston partially defining the combustion chamber away from the intake valves during a piston intake stroke while both of the first and second valves are open; forcing the piston towards a bottom dead center position during at least an initial portion of the piston intake stroke; and closing the second intake valve during the piston intake stroke and substantially prior to closing the first intake valve.

There has thus been outlined, rather broadly, certain features of embodiments of the invention in order that the detailed descriptions thereof may be better understood, and in order that the present contribution to the art may be better appreciated. Additional or alternative features of embodiments of the invention are described in further detail below.

In this respect, before explaining embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

To accomplish the above and related objects, the invention may be embodied in the forms illustrated in the accompanying drawings, attention being called to the fact, however, that the drawings are illustrative only, and that changes may be made in the specific constructions illustrated. Moreover, it is to be noted that the accompanying drawings are not necessarily drawn to scale or to the same scale. In particular, the scale of some of the elements of the drawings may be exaggerated to emphasize characteristics of the elements.

Various other objects, features and attendant advantages of the present invention will become fully appreciated as the same becomes better understood when considered in conjunction with the accompanying drawings, in which like reference characters designate the same, similar or corresponding parts throughout the several views, and wherein:

FIGS. 6-17 are diagrammatic layouts of an engine cylinder's piston and valve positions at the respective crankshaft angles indicated A through M in FIG. 4, wherein:

FIG. 6 indicates the cylinder's piston and valve positions at 360° BTDC (Point A) and 360° ATDC (Point M), at TDC between the piston's compression and power strokes;

FIG. 7 indicates the cylinder's piston and valve positions at 270° BTDC (Point B), during the piston's power stroke;

FIG. 8 indicates the cylinder's piston and valve positions at 210° BTDC (Point C), during the piston's power stroke;

FIG. 9 indicates the cylinder's piston and valve positions at 180° BTDC (Point D), at BDC between the piston's power and exhaust strokes;

FIG. 10 indicates the cylinder's piston and valve positions at 90° BTDC (Point E), during the piston's exhaust stroke;

FIG. 11 indicates the cylinder's piston and valve positions at 7° BTDC (Point F), during the piston's exhaust stroke;

FIG. 12 indicates the cylinder's piston and valve positions at 0° TDC (Point G), at TDC between the piston's exhaust and intake strokes;

FIG. 13 indicates the cylinder's piston and valve positions at 7° ATDC (Point H), during the piston's intake stroke;

FIG. 14 indicates the cylinder's piston and valve positions at 75° ATDC (Point I), during the piston's intake stroke;

FIG. 15 indicates the cylinder's piston and valve positions at 90° ATDC (Point J), during the piston's intake stroke;

FIG. 16 indicates the cylinder's piston and valve positions at 180° ATDC (Point K), at BDC between the piston's intake and compression strokes;

FIG. 17 indicates the cylinder's piston and valve positions at 270° ATDC (Point L), during the piston's compression stroke;

Figure 1:
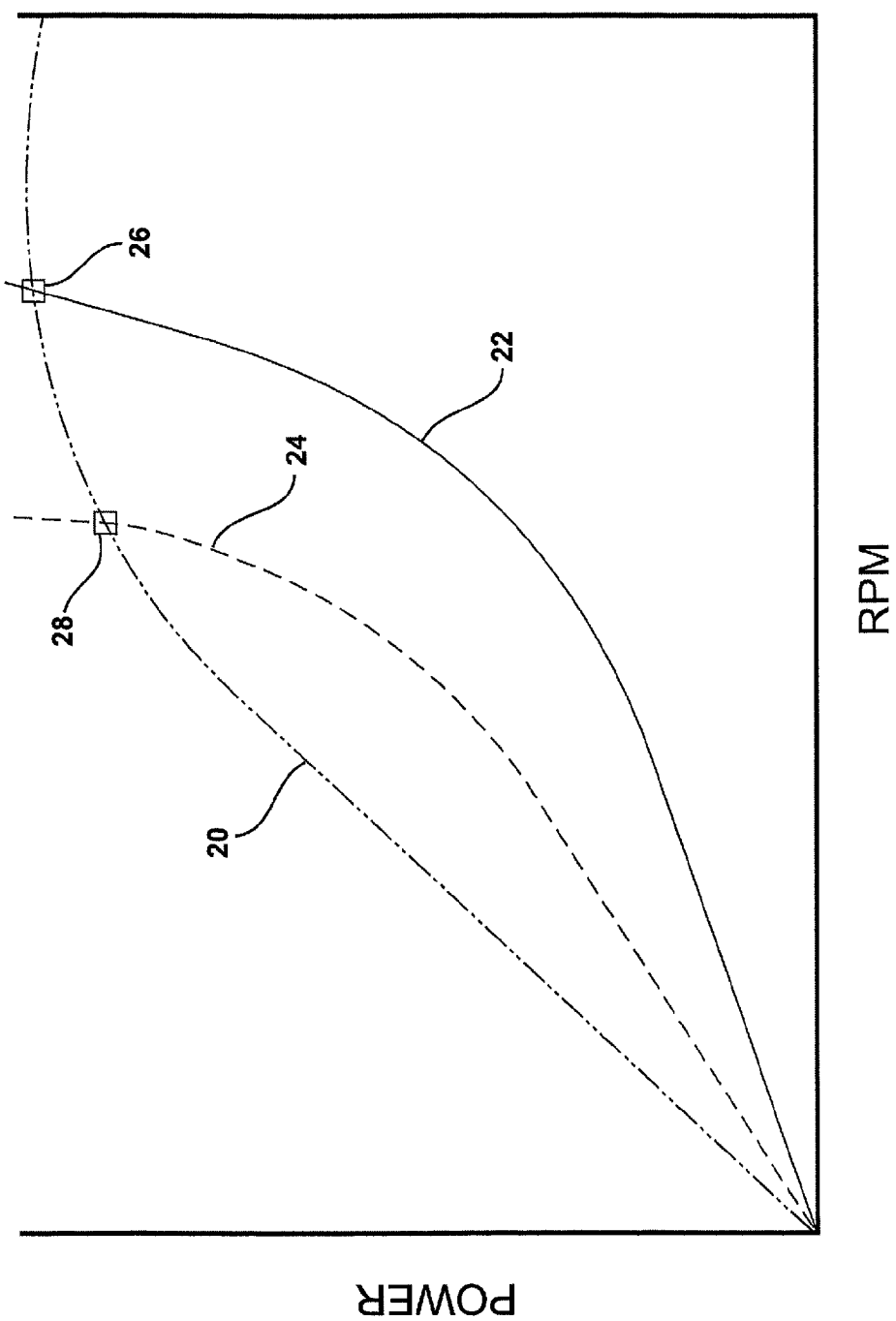
FIG. 1 shows the generalized, known relationship between engine output and turbocharger reaction when these two devices are mated together.

While the invention is susceptible to various modifications and alternative forms, specific embodiments thereof are shown by way of example in the drawings and may herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims.

As discussed above, FIG. 1 is a chart showing reciprocating engine output curve 20, which is typical of internal combustion engines, and turbocharger power draw curves 22 which reflect the turbine power required to drive the turbo's compressor for boosting the pressure of intake air provided to the engine combustion chamber. Also shown is turbo power requirement curve 24 which, unlike curve 22, includes turbocharger inefficiencies such as friction and turbine or compressor leakage. The match points 26, 28 are indicated where the engine output curve and turbo power requirement curves intersect.

Figure 2:
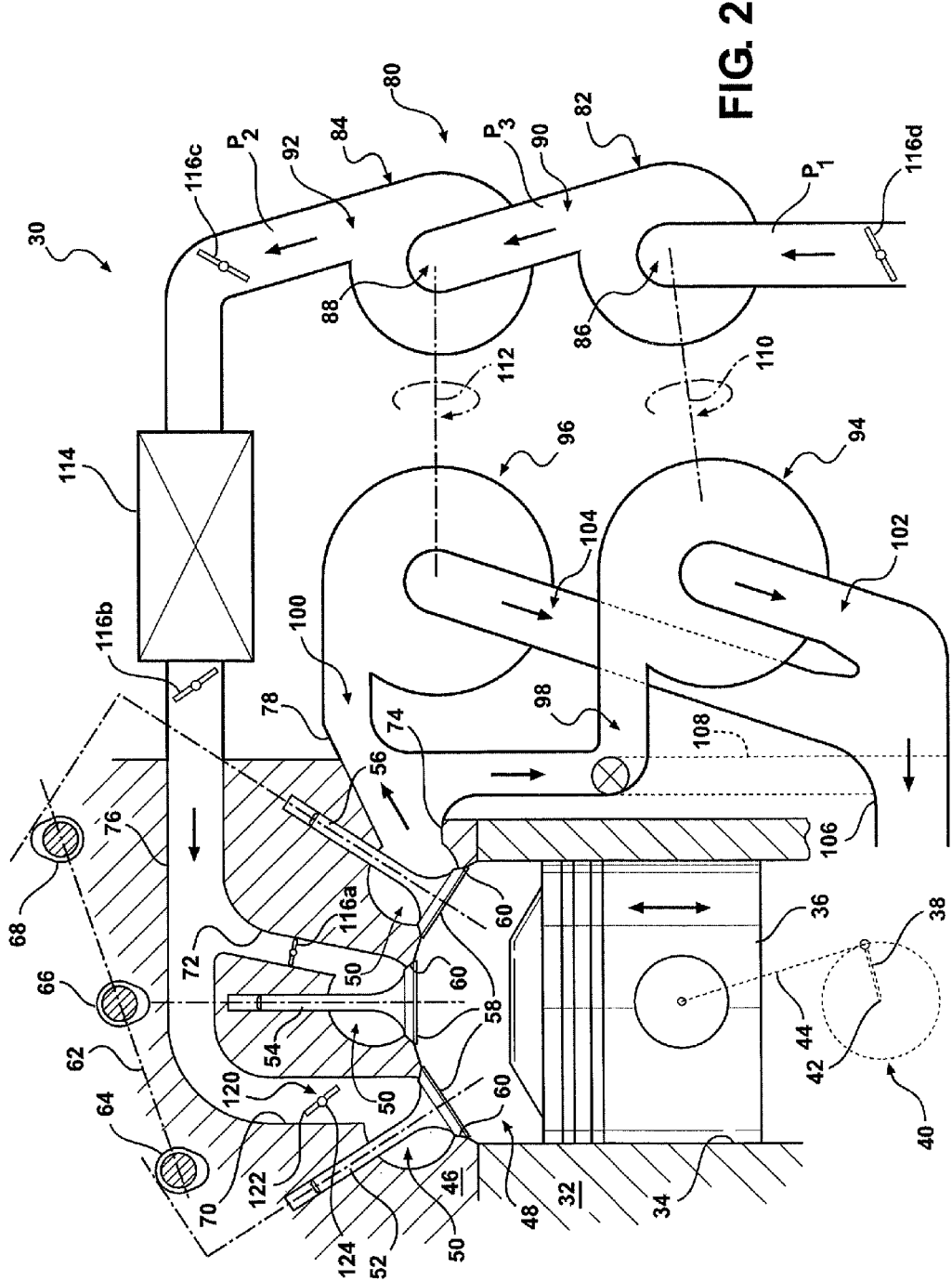
FIG. 2 is a diagrammatic layout of a turbocharged internal combustion engine according to a first embodiment.
Figure 3:
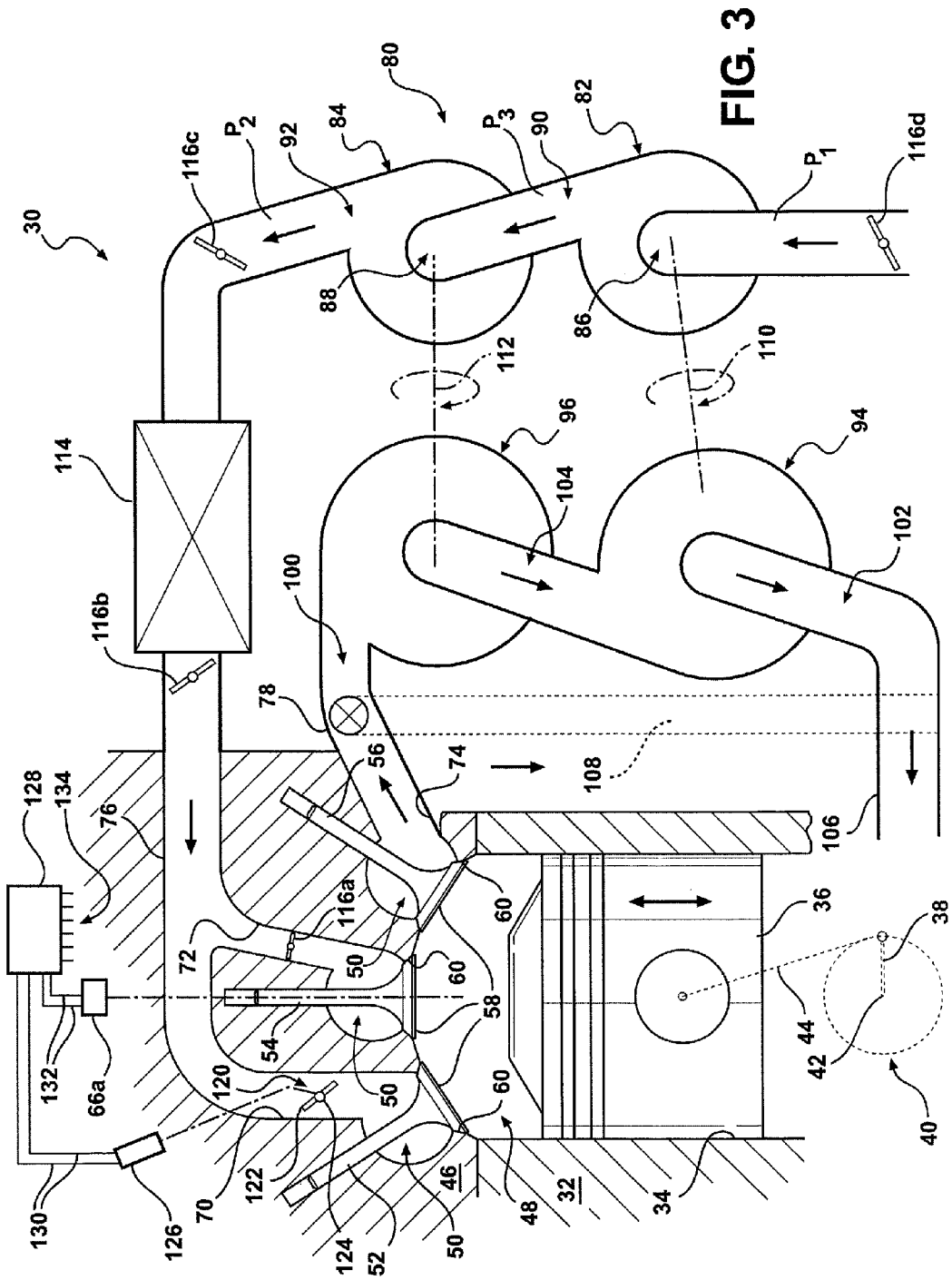
FIG. 3 is a diagrammatic layout of a turbocharged internal combustion engine according to a second embodiment.

FIGS. 2 and 3 show slightly differing embodiments of an engine 30 according to the present invention. Engine 30 includes engine block 32 in which is formed the bore of cylinder 34. Engine 30 would include a plurality of additional such cylinders, and in each cylinder is disposed a reciprocating piston. Depicted cylinder 34 is understood by one of ordinary skill in the art to represent the engine's number one cylinder, i.e., first of the plurality of cylinders in the engine's firing or fuel injection order, depending on the type of engine. Piston 36 is attached to crank 38 of crankshaft 40, which is rotatable about crank axis 42. The connection between piston 36 and crank 38 is through connecting rod 44. It is to be understood that the following description as it relates to number one cylinder 34 or features associated therewith, likewise relates to the other cylinders of engine 30, except as otherwise noted or would be otherwise readily apparent to one of ordinary skill in the art.

Attached to engine block 32 and disposed over a plurality of aligned cylinders is cylinder head 46. Each cylinder has defined therein between its piston 36 and cylinder head 46, a combustion chamber 48. Cylinder head 46 is provided with ports 50 associated with each cylinder in which is disposed a plurality of fluid flow valves that includes normal intake valve 52, auxiliary intake valve 54, and at least one exhaust valve 56 (i.e., one or more exhaust valve(s)). Each valve 52, 54, and 56 is depicted as being the typical poppet type that includes head 58. Relative to the normal intake valve 52, the auxiliary intake valve 54 can be smaller in size, with function and timing as described below. In certain embodiments of engine 30, each valve is periodically lifted off of its valve seat 60 formed in cylinder head 46 in response to its interaction with camshaft 62. Camshaft 62 is rotatably attached to and driven by crankshaft 40 in the usual manner, such as through a timing belt or timing chain (not shown). In a four-stroke internal combustion engine, camshaft 62 rotates at one-half the speed of crankshaft 40, and one full valve train cycle occurs over a 360° rotation of camshaft 62, or a 720° rotation of crankshaft 40 between −360° and +360° as discussed further below with reference to FIG. 4 which relates to a single, non-limiting, illustrative example of an embodiment of engine 30.

Respective to cylinder 34, the power stroke of its piston 36 occurs between angular crankshaft positions of −360° and −180°; the exhaust stroke occurs between −180° and 0°; the intake stroke occurs between 0° and +180°; and the compression stroke occurs between +180° and +360°. The angular crankshaft positions at 0° and ±360° are referred to as the top dead center (TDC) positions of both crankshaft 40 and piston 36 of number one cylinder 34, at which piston reaches its nearest proximity to cylinder head 46. The angular crankshaft positions at ±180° are referred to as the bottom dead center (BDC) positions of both crankshaft 40 and piston 36 of number one cylinder 34, at which piston is most distant from cylinder head 46. Relative to 0° TDC, previously encountered angular positions of the rotating crankshaft 40, between 0° and −360°, are herein referred to as being before top dead center (BTDC) and later encountered angular positions of the rotating crankshaft 40, between 0° and +360°, are herein referred to as being after top dead center (ATDC).

Camshaft lobes 64, 66, and 68 are respectively engaged with valves 52, 54, and 56, and each valve is configured to periodically lift valve off its seat 60 in a timed fashion and through a varying degree of lift in the ordinary, well-known manner. Moreover, it is to be understood that camshaft 62, regardless of its depiction in the embodiment of FIG. 2, includes as many lobes as necessary to actuate the fluid flow valves of the cylinders associated therewith. It is to be further understood that each cylinder of engine 30 may include a plurality of exhaust valves 56 although only one is shown in the Figures. As noted above, an existing multivalve engine modified to implement the present invention may be of the typical four valve configuration, which includes two intake valves and two exhaust valves. Camshaft 62 shown in FIG. 2 is to be understood as being included in engine 30 depicted in FIG. 3, perhaps modified as it relates to auxiliary intake valve 54 to omit lobe 66, and allow control of auxiliary intake valve 54 to instead be through a hydraulic or electric actuator 66a which can provide a means for altering the timing of valve 54 during operation of engine 30. As depicted in FIG. 3, actuator 66a is an electric solenoid and is discussed further herein below.

Cylinder head 46 is provided with runners 70, 72, and 74 which respectively define an airflow channel associated with each of valves 52, 54, and 56. Each runner is in fluid communication with the respective port 50 of its associated valve. Intake runners 70 and 72, through which pressure-boosted air is provided to intake valves 52 and 54, are in fluid communication with intake manifold 76. Intake manifold 76 and cylinder head 46 are configured to distribute the intake air, which may or may not include fuel depending on the engine type or fuel system configuration, among the engine's cylinders. Runner(s) 74, into which exhaust gases are expelled from combustion chamber 48 via exhaust valve(s) 56 communicates with exhaust manifold 78.

Engine 30 includes an air intake air pressurization device 80. In the depicted embodiments of engine 30, device 80 is a turbocharger. Turbocharger 80 may be a single ordinary turbocharger, or may be comprised of two or more separate, smaller turbochargers whose compressors are serially connected, or may be a specialty turbocharger including multistage compression.

Rapid pressure rise across the compressor(s) of turbocharger 80 can be achieved is obtained not only through the use of multiple smaller turbos, but also through multiple stages of compression. For example, inlet air pressures will rise much faster with two-stage, rather than only single-stage compression. Thus, multi-stage compression across smaller turbos greatly favors turbo lag reduction. Referring to FIGS. 2 and 3, the exemplary embodiment of turbocharger 80 is shown as being comprised of two separate turbochargers whose compressors are serially connected to achieve a substantial overall intake air pressure boost relative to ambient air pressure.

Depicted turbocharger 80 thus includes first and second turbochargers respectively including first compressor 82 and second compressor 84 that are serially connected. First compressor 82 includes inlet 86 that is the air inlet to turbocharger 80, into which is received air at a first pressure P1, which may be at or near ambient pressure. Second compressor 84 includes an outlet 92 that is the air outlet from turbocharger 80, and from which air at pressure P2, which is substantially higher than pressure P1, is expelled and provided to intake manifold 76. Air at pressure P3 intermediate P1 and P2 is received by inlet 88 of second compressor 84 which is in serial fluid communication with outlet 90 of first compressor 82.

The first and second turbochargers of turbocharger 80 also respectively include first and second turbines 94 and 96. First turbine 94 includes inlet 98, and second turbine 96 includes inlet 100. First turbine 94 includes outlet 102, and second turbine 96 includes outlet 104. In the embodiment shown in FIG. 2, the first and second turbines 94, 96 are in parallel communication, and inlets 98, 100 each receive exhaust gases delivered from the combustion chamber 48 via exhaust manifold 78, and outlets 102 and 104 of first and second turbines 94 and 96 each expel exhaust gases having flowed through the respective turbine, these expelled exhaust gasses directed to exhaust system 106. Notably, the first turbine 94 and first compressor 82 may be relatively smaller and lighter than the second turbine and compressor 96, 84, and therefore have less turbo lag, which will permit the first turbocharger to spool up quickly and thus permit turbocharger 80 to begin reacting more immediately to increases in engine demand.

Alternatively, as shown in FIG. 3, first and second turbines 94 and 96 may be serially connected, with inlet 100 of second turbine 96, the exhaust gas inlet of turbocharger 80, receiving exhaust gases from combustion chamber 48 via exhaust manifold 78. Exhaust gases expelled from outlet 104 of second turbine 96 are received by inlet 98 of first turbine 94, and exhaust gases expelled from first turbine outlet 102, the exhaust gas outlet of turbocharger 80, are directed to exhaust system 106.

In either embodiment shown in FIGS. 2 and 3, first and second turbines 94 and 96 are respectively in driving communication with first and second compressors 82 and 84 through shafts 110 and 112. Further, regardless of whether turbines 94 and 96 are connected serially or in parallel, turbocharger 80 may be provided with an exhaust flow control device such as wastegate 108 through which exhaust gases may pass directly from exhaust manifold 78 to exhaust system 106, bypassing turbines 94 and 96 under high exhaust gas pressure conditions present in manifold 78 or other sensed circumstances that would open the wastegate valve and allow the exhaust gases expelled from combustion chamber 48 to bypass turbocharger 80. Tests of an actual installation may show the desirability of a wastegate although it is unlikely that turbines 94, 96 would be overpowered, considering that only one half of the total exhaust energy is available to each of the first and second turbochargers comprising turbocharger 80. Thus, due to the increased control against cylinder overpressurization afforded by the present invention, it is anticipated that wastegate 108 may be optionally provided in or forgone entirely from engine 30.

Disposed between turbocharger outlet 92 and intake manifold 76, is optional aftercooler 114, a heat exchanger which is preferably included to lower boosted air temperatures and obtain higher cycle efficiencies. The outlet air pressure P2 from turbocharger air outlet 92 could be as high as four atmospheres, and consequently quite hot. At high temperatures, even an aftercooler 114 of modest dimensions could achieve reasonable temperature reduction with obvious benefit to engine 30.

In versions of engine 30 that are spark ignition or Otto cycle engines, the flow of air through compressors 82 and 84, intake manifold 76, and runners 70 and 72, may be further controlled by means of a throttle valve 116, the throttle valve being variably opened in response to desired engine power. In such engines, engine power is at a maximum at wide open throttle, when throttle valve 116 is most fully open, and correspondingly greater amounts of air and fuel are mixed and ignited in combustion chamber 48, in the well-known manner. As shown in FIGS. 2 and 3, a throttle valve 116 may be located at various different places in the air intake system. For example, throttle valve 116a is disposed upstream of auxiliary intake valve 54 in runner 72. Alternatively, throttle valve 116b is disposed upstream of both runners 70 and 72 respectively associated with normal and auxiliary intake valves 52 and 54 and downstream of aftercooler 114. Alternatively, throttle valve 116c is disposed downstream of turbocharger air outlet 92 and upstream of aftercooler 114. Alternatively, throttle valve 116d is positioned upstream of turbocharger air inlet 86. Throttle valve 116 may be omitted altogether in types of engine 30 in which the intake airflow is not throttled.

Engine 30 further includes a control valve 120 disposed immediately upstream of normal intake valve 52 in runner 70. Control valve 120 may be a butterfly-type valve including a plate 122 fixed to a rotatable shaft 124. Shaft 124 may be controllably engaged with a variably positionable actuator 126, such as a stepper motor, as shown in FIG. 3. It is to be understood, however, that the embodiment of engine 30 shown in FIG. 2 also includes actuator 126 (e.g., a stepper motor) in controlling engagement with control valve 120. Valve 120 has an open position in which intake airflow to combustion chamber 48 through runner 70 is substantially unobstructed by valve 120 and a closed position in which airflow through runner 70 is substantially obstructed by valve 120. Valve 120 may also include intermediate positions between its open and closed positions in which the airflow through runner 70 is variably restricted and controlled by actuator 126, which is in electronic communication with engine control module or unit (ECU) 128, the output 130 of which is connected to actuator 126. Following modern practice, ECU may include micro-processors to monitor and/or control various engine functions. Stepper motor 126 may be driven by a micro-controller incorporated into ECU 128, or be controlled by any other method that lends itself to this purpose. As mentioned above, the opening and closing timing of auxiliary intake valve 54 may be controlled with a hydraulic or electronic control device 66a. Device 66a may be an electric solenoid in communication with output 132 of ECU 128.

ECU 128 is provided with inputs 134 that are connected to engine condition sensors (not shown) that are typical of internal combustion engines. For example, inputs 134 may include an indication of peak cylinder pressure. Output 130 of ECU 128 delivers a signal which controls actuator 126 and control valve 120 that reflects engine output and is generated by the ECU micro-processor on the basis of engine conditions sensed and communicated to the ECU through its inputs 134. In engine 30, under high engine output conditions, valve 120 is moved into its closed position, such that air delivered to combustion chamber 48 is solely through the periodic opening of auxiliary intake valve 54.

Figure 4:
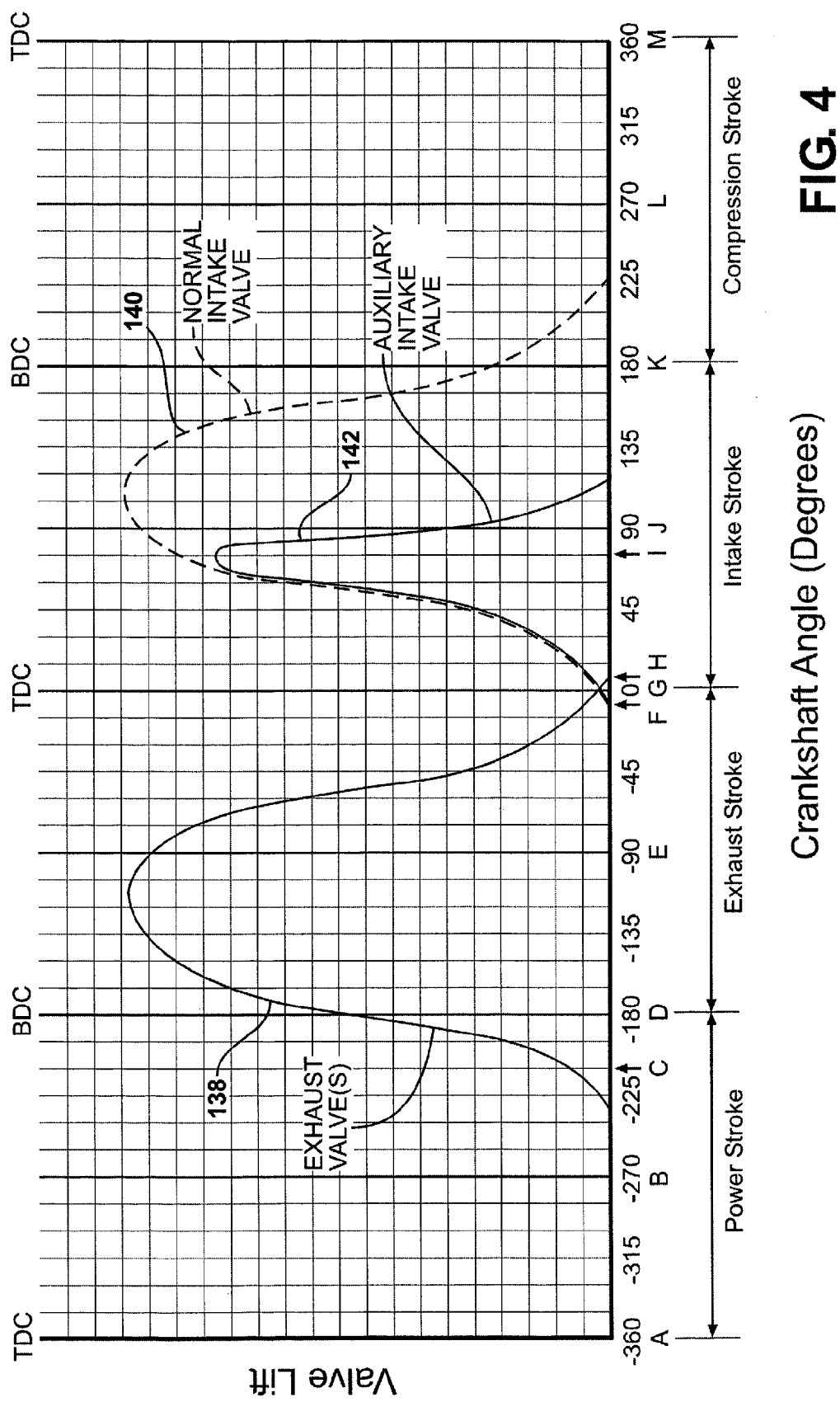
FIG. 4 is a chart showing an example of engine cylinder intake and exhaust valve lift versus crankshaft angle.

FIG. 4 mentioned above is a valve position versus crankshaft angle diagram of a type well-known in the art, the abscissa of FIG. 4 being centered at 0° TDC, and moving leftward from 0° to positions that are BTDC and rightward from 0° to positions that are ATDC. As one of ordinary skill in the art understands, 360° BTDC of a particular cycle is the 360° ATDC position of the previous cycle. The ordinate of FIG. 4 is indicative of valve lift off of seat 60, the valve lift indicated qualitatively rather than quantitatively for each of valves 52, 54, and 56, and the substantially bell-shaped intake and exhaust valve lift curves are typical of cam-driven valves. FIG. 4 relates to a single, non-limiting, illustrative example of an embodiment of engine 30.

FIG. 4 includes curve 138 for exhaust valve 56 that shows it is entering an open state (in which the valve is off of its seat 60) at approximately 220° BTDC and entering a closed state (in which the valve is seated) at approximately 7° ATDC. Maximum exhaust valve lift is encountered at approximately 112° BTDC. As mentioned above, an existing multivalve engine may be modified to implement the present invention, and such an embodiment of engine 30 may include one or more exhaust valve(s) 56. For example, an engine of four valves per cylinder type may include two exhaust valves 56. For the purposes of describing embodiments of engine 30 having two or more exhaust valves 56, as well as the depicted embodiment of engine 30 having a single exhaust valve 56, curve 138 is to be understood as being representative of the exhaust valve(s) 56 of cylinder 34, regardless of their number. Therefore, reference herein to a singular exhaust valve 56 shall be interpreted as relating equally to a plurality of exhaust valves 56.

FIG. 4 also includes curve 140 for normal intake valve 52 that shows it enters an open state at approximately 7° BTDC and entering a closed state at approximately 230° ATDC, with maximum normal intake valve lift being at approximately 112° ATDC. Curve 140 is shown in dashed lines for the reason that, with valve 120 in its fully closed position, normal intake valve 52 is essentially inoperable, with no intake air received from intake manifold 76 into runner 70 being communicated past valve 52 into combustion chamber 48.

FIG. 4 further includes curve 142 for auxiliary intake valve 54, which is shown as entering its open state substantially simultaneously with normal intake valve 52, and entering its closed state substantially before normal intake valve 52 enters its closed state. The closing of auxiliary intake valve 54 preferably occurs in a range of crankshaft angles centered approximately around 120° ATDC, that may be about ±20°. The normal intake valve 52 shall remain open until well after piston 36 reaches BDC at Point K (180° ATDC), as in standard engine design practice. Both intake valves 52, 54 can be operated by the same camshaft 62, and if so, shall have separate cam profiles to provide their differences in duration timing. It is to be understood that particular attributes of valve duration angles are used herein as examples only, to illustrate principles of operation, and the use of any such particular attribute should not be inferred as meaning that another, better value might not be found through experimentation or calculation.

In the shown example, auxiliary intake valve 54 has a maximum valve lift at approximately 75° ATDC and reaches its closed state at approximately 113° ATDC. It is to be understood the opening of auxiliary intake valve 54 need not conform precisely with the simultaneous opening of normal intake valve 52, and, as shown in FIG. 3 and mentioned above, auxiliary intake valve 54 may be controlled by means of solenoid 66a instead of being in operative engagement with cam lobe 66. In cases where auxiliary intake valve 54 is controlled by a solenoid 66a, the shape of curve 142 may deviate from the bell shape shown in FIG. 4 and instead have a more rectangular shape. Exemplary curve 142 shown in FIG. 4 represents auxiliary intake valve 54 being cam-driven.

Figure 5:
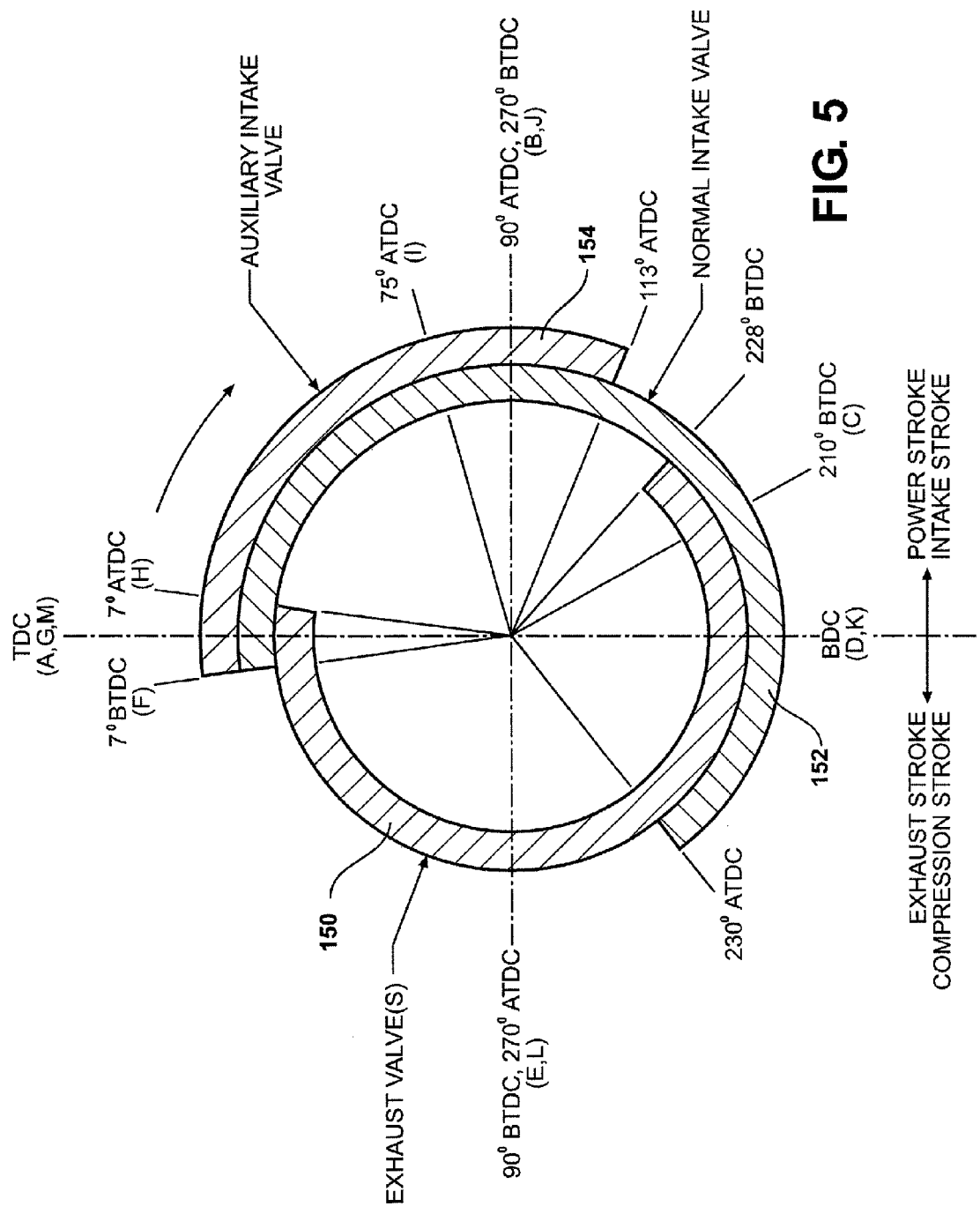
FIG. 5 is a valve timing diagram showing the engine cylinder's open intake and exhaust valve durations indicated in FIG. 4.

FIG. 5 shows a valve timing chart for number one cylinder 34 which indicates the angular positions of crankshaft 40 at which each of valves 52, 54, and 56 reach an open state in which it is separated from valve seat 60 irrespective of the amount of valve lift, and begins its respective open duration. As shown in FIG. 5, segment 150 corresponds to the duration of exhaust valve 56 in its open state, segment 152 corresponds to the duration of normal intake valve 52 in its open state, and segment 154 corresponds to the duration of auxiliary intake valve 54 in its open state. The left side of FIG. 5 relates to the exhaust and compression strokes of piston 36, and the right side of FIG. 5 indicates the power stroke and intake stroke of piston 36. Those of ordinary skill in the art will recognize that the entire four-stroke, 720° cycle that crankshaft 40 rotates through between 360° BTDC and 360° ATDC shown in FIG. 4, is represented by two complete clockwise revolutions about the center of the diagram in FIG. 5.

As FIGS. 4 and 5 show, exhaust valve 56 has an open state when normal intake valve 52 and auxiliary intake valve 54 are both in a closed state, and intake valves 52, 54 have an open state when exhaust valve 56 is in a closed state, and auxiliary intake valve 54 enters its closed state substantially before normal intake valve 52 does.

It is to be understood that the above-described valve timing schema may be readily adapted to existing multivalve IC engines having at least two intake valves and at least one exhaust valve per cylinder. Typically, such existing multivalve IC engines are of a four-valve configuration, with each cylinder having two intake valves and two exhaust valves. Such modification would entail replacing the camshaft that controls an intake valve to provide a cam lobe 66 that produces the earlier-closing characteristic of auxiliary intake valve 54 vis-à-vis another intake valve(s) which corresponds to normal intake valve 52. It is anticipated that in some cases it may be determined that the opening and closing characteristics of the normal intake valve 52 and the exhaust valve(s) 56 may remain substantially unchanged vis-à-vis the particular existing multivalve engine modified to implement the present invention, and thus their respective cam lobes of the replacement camshaft may remain unchanged. In modifying an existing engine to implement the present invention, the control valve 120 and its actuator 126 are also incorporated and adapted for having a closed position in high engine power circumstances. The ECU 128 would also be revised to controllably actuate valve 120 under sensed high engine power conditions. The device 80 for providing high intake air pressures to combustion chamber 48 (e.g., a suitable turbocharger) may already be present in the engine being modified, or would also be added.

The normal intake valve 52 remains fully effective at all times when inlet air pressures and temperatures do not create detonation problems in engine 30. As these temperatures and pressures rise, control valve 120 shall commence closing at a rate that shall maintain workable engine cylinder conditions. At full engine power, the control valve 120 will be fully closed, and all air requirements of cylinder 34 would then be met by the auxiliary intake valve 54. The area of engine operation where the control valve 120 varies between full open and full closed positions are determined by experimentation and entail use of actuator 126 connected to output 130 of ECU 128.

As mentioned above, intake air pressure P2 may be four atmospheres, resulting from 4:1 air compression ratio relative to ambient across turbocharger 80. To prevent high engine output overpressure with a 4:1 boosted inlet pressure ratio, which the engine cannot even begin to use without self-destructing, the normal intake valve 52 is rendered ineffective by closing the upstream control valve 120, and early closing auxiliary intake valve 54 is used. Since the auxiliary intake valve 54 opens simultaneously with the normal intake valve 52, high pressure air is admitted to the engine cylinder 34 and forces piston 36 motion much like a steam engine. When the auxiliary intake valve 54 closes early, the high pressure air expands as the engine piston 36 continues downward continuing its contribution to shaft torque. The air trapped in cylinder 34 and port 50 of normal intake valve 52, closed off by closed control valve 120, drops in pressure and temperature until piston 36 reaches BDC at Point K (180° ATDC). With proper design of the system the expanded condition of the trapped air allows the piston 36 to recompress it, and the fuel mixed therewith, during the compression stroke without high design compression ratio detonation even at or near wide open throttle.

Those of ordinary skill in the art will now recognize and appreciate that the present invention also facilitates matching of the reciprocating IC engine and the device 80 that provides a suitably high intake air pressure (e.g., turbocharger 80), by having the ability to controllably adjust control valve 120 with varying engine speed and load. It is envisioned that, regardless of the type of engine cycle additional control valves 120 and associated actuators 126 may also be provided at various locations in the intake system of engine 30 (for example, where throttle valves 116a-d are shown), each control valve actuator 126 separately controlled by ECU 128 as described above, to further refine controlled matching of the engine 30 to its intake air pressure boosting device 80.

Referring now to FIGS. 4 and 6 through 17, there is shown sequence of selected positions along the abscissa of FIG. 4 indicated by letters A through M, regardless of the position of control valve 120. In each case, piston 36 and valves 52, 54, and 56 are shown positioned relative to each other, cylinder 34, valve seats 60, and head 46.

Figure 6:
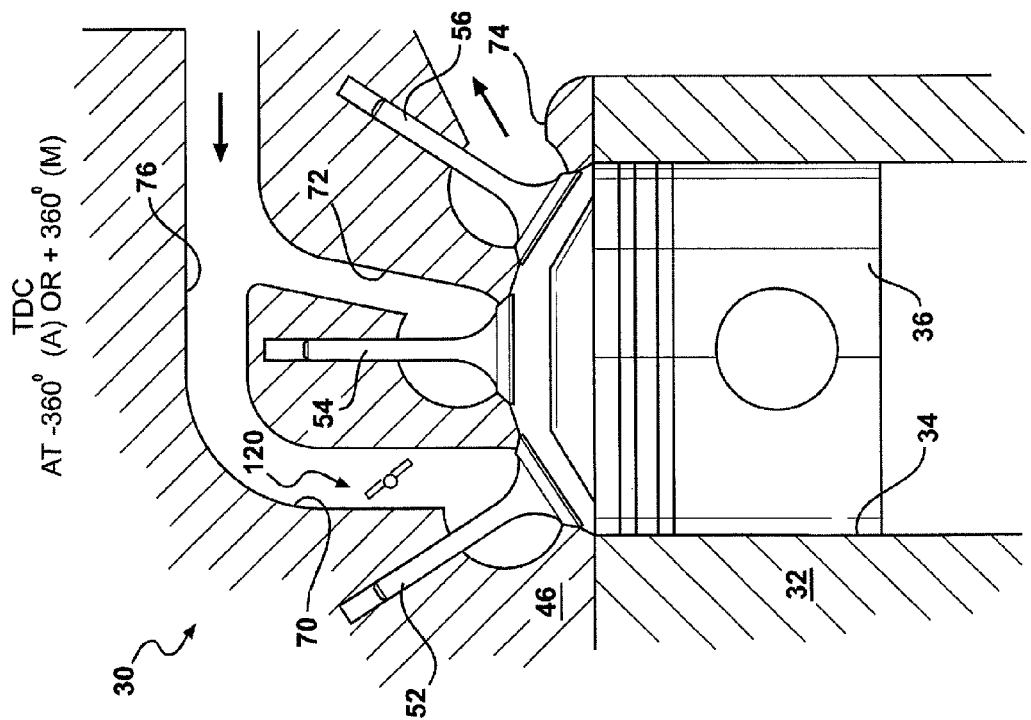

In FIG. 6, piston 36 is shown at a TDC at 360° BTDC (Point A) or 360° ATDC (Point M), between its compression and power strokes. In FIG. 6, all valves 52, 54, and 56 are closed and there is no flow of air into combustion chamber 48 or flow of exhaust gases out of combustion chamber 48 into exhaust manifold 78.

Figure 7:
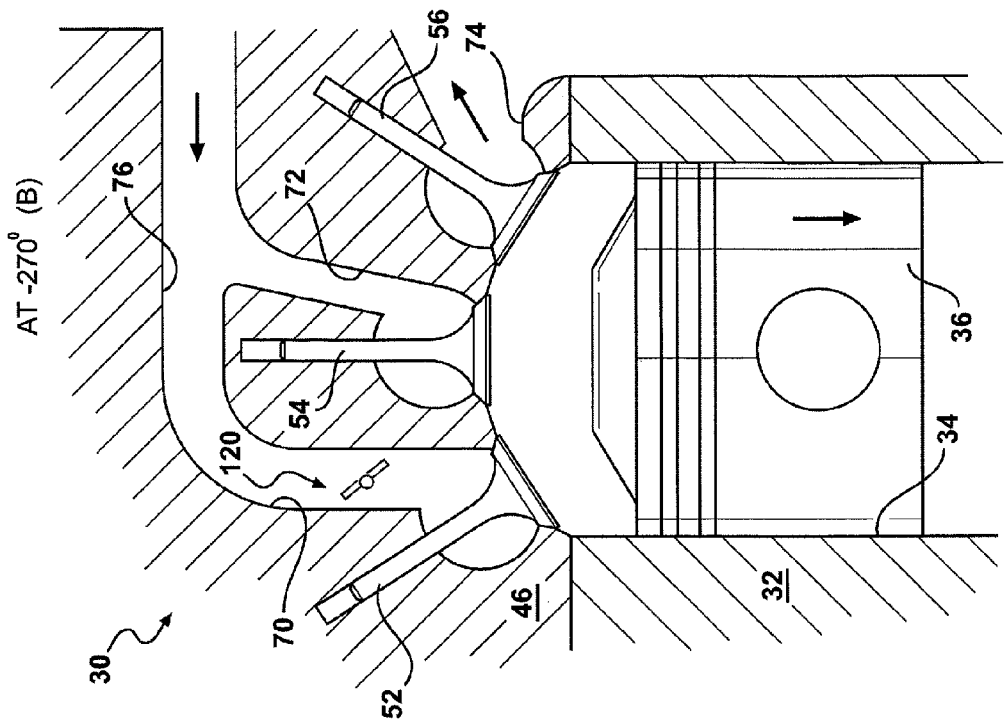

FIG. 7 shows piston 36 during its power stroke at 270° BTDC (Point B), with valves 52, 54, and 56 all still in their closed positions.

Figure 8:
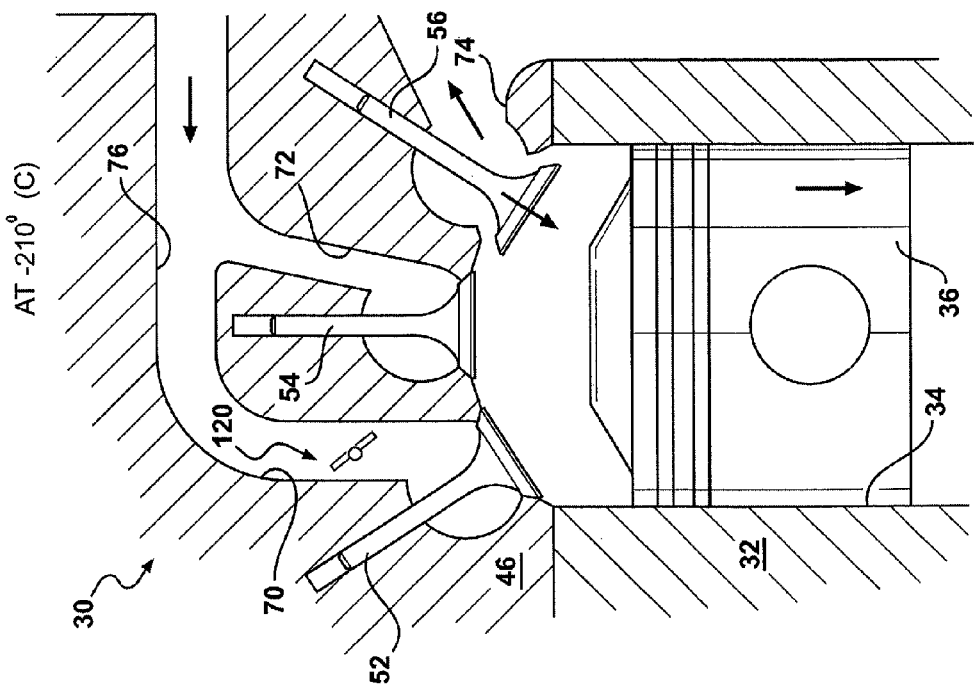

FIG. 8 shows piston 36 during its power stroke at 210° BTDC (Point C), with exhaust valve 56 opening and intake valves 52 and 54 remaining closed.

Figure 9:
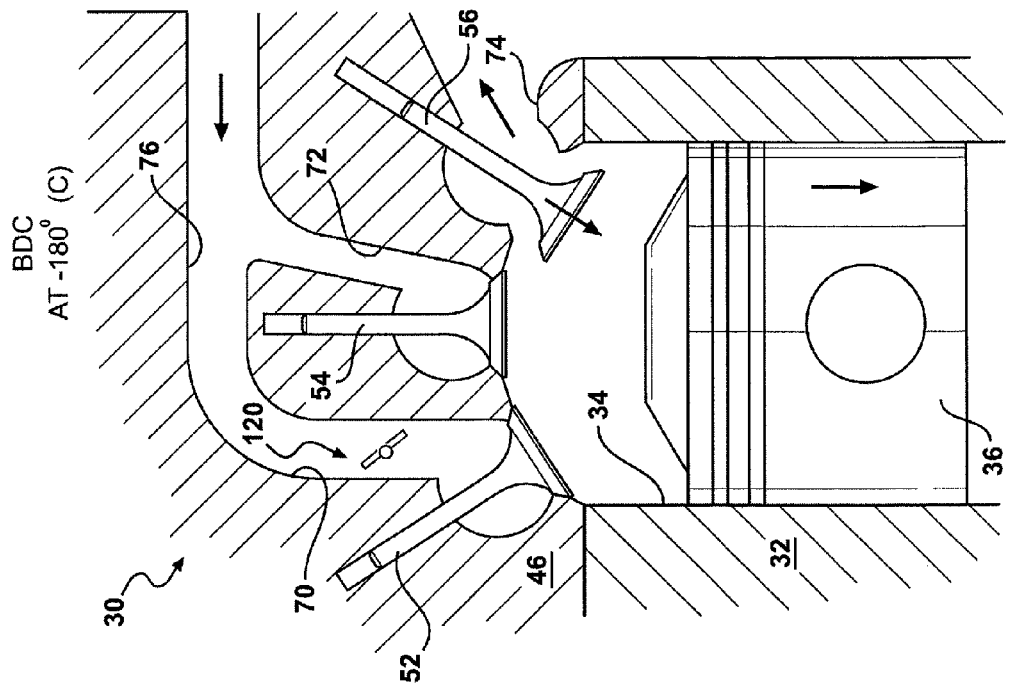

FIG. 9 shows piston 36 at 180° BTDC (Point D), between its power and exhaust strokes. In FIG. 9, exhaust valve 56 continues to open and intake valves 52 and 54 remain closed.

Figure 10:
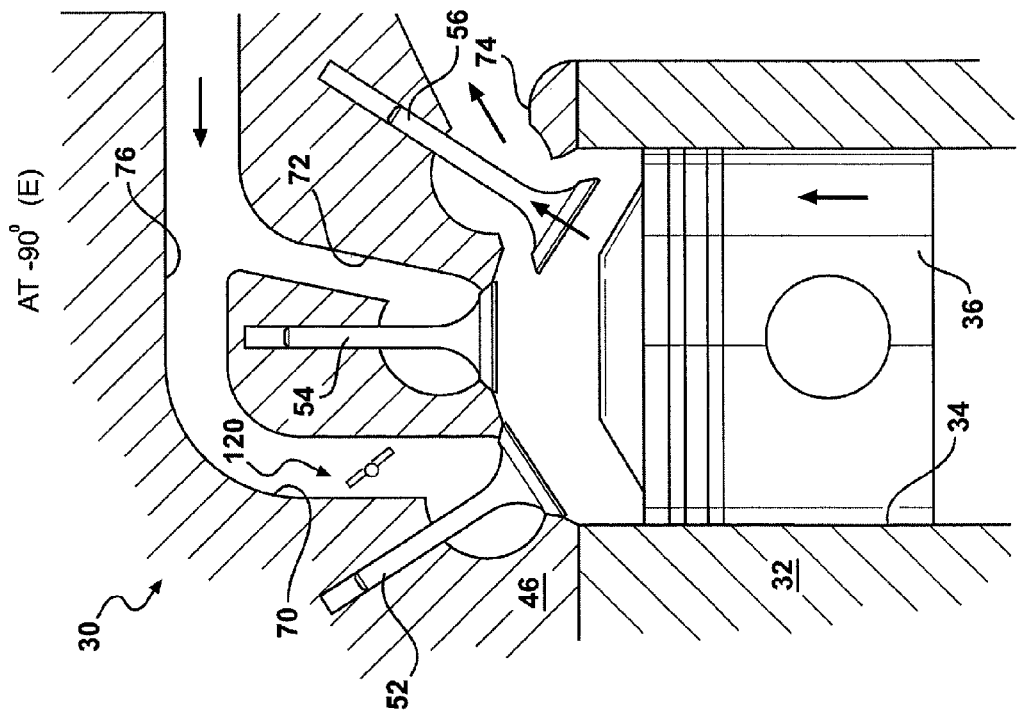

FIG. 10 shows piston 36 during its exhaust stroke at 90° BTDC (Point E), with exhaust valve 56 now closing, and intake valves 52 and 54 remaining closed.

Figure 11:
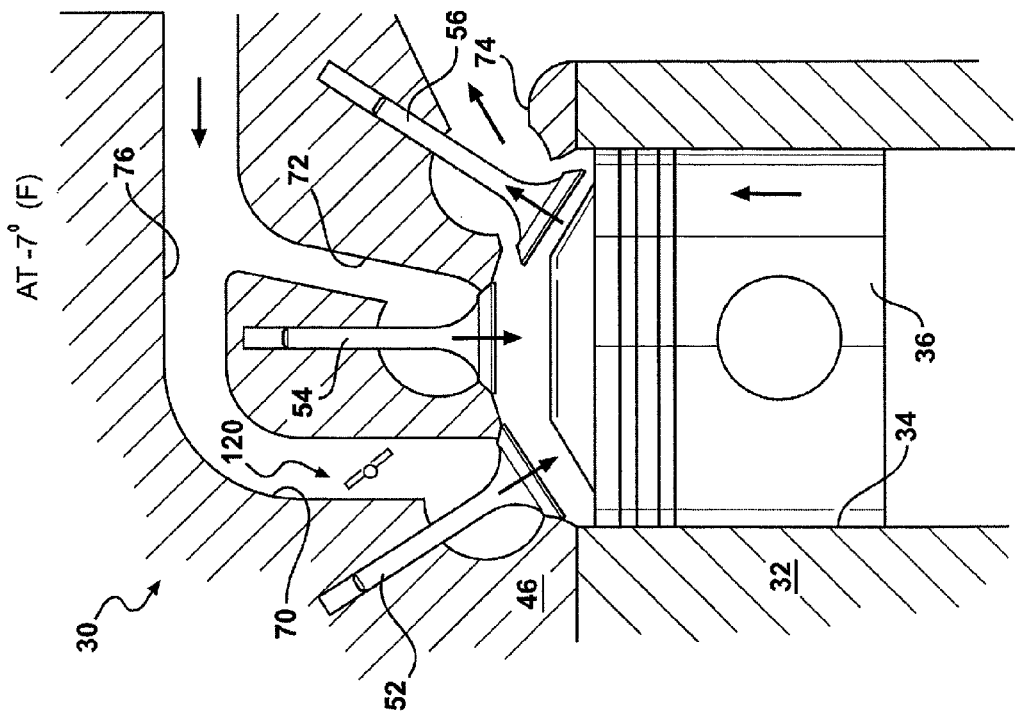

FIG. 11 shows piston 36 during its exhaust stroke at approximately 7° BTDC (Point F), with the normal and auxiliary intake valves 52, 54 just moving off of their seats 60 and entering their open states, and exhaust valve 56 continuing to move toward its closed state.

Figure 12:
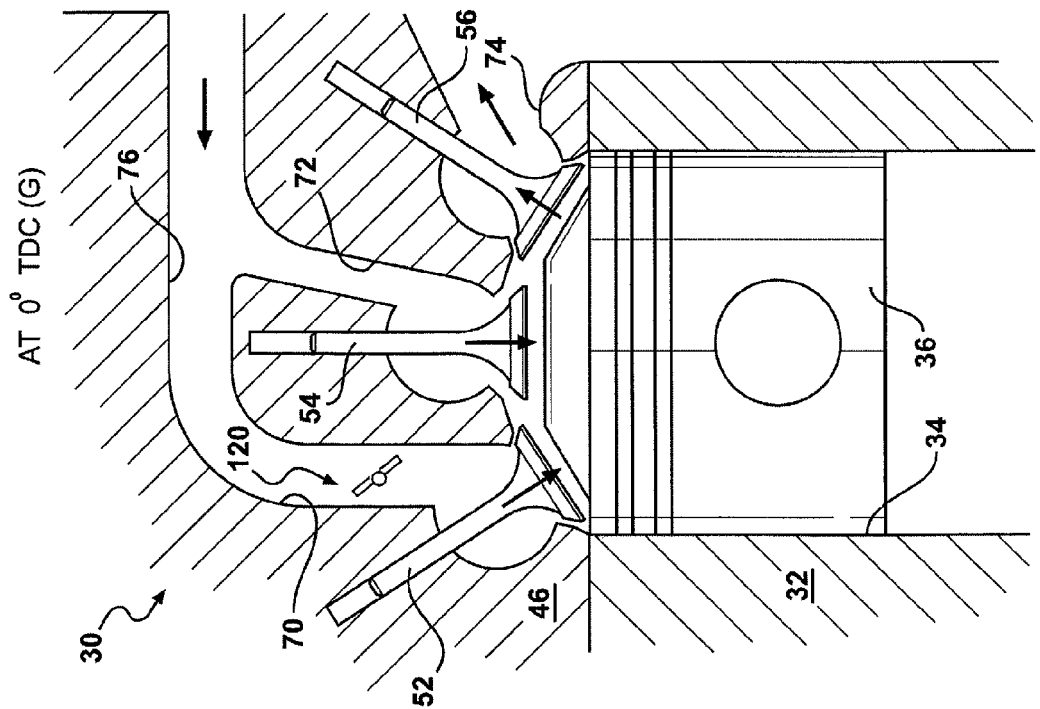

FIG. 12 shows piston 36 at 0° TDC (Point G), between its exhaust and intake strokes. In FIG. 12, the normal and auxiliary intake valves 52, 54 are opening, and exhaust valve 56 continues moving toward its closed state.

Figure 13:
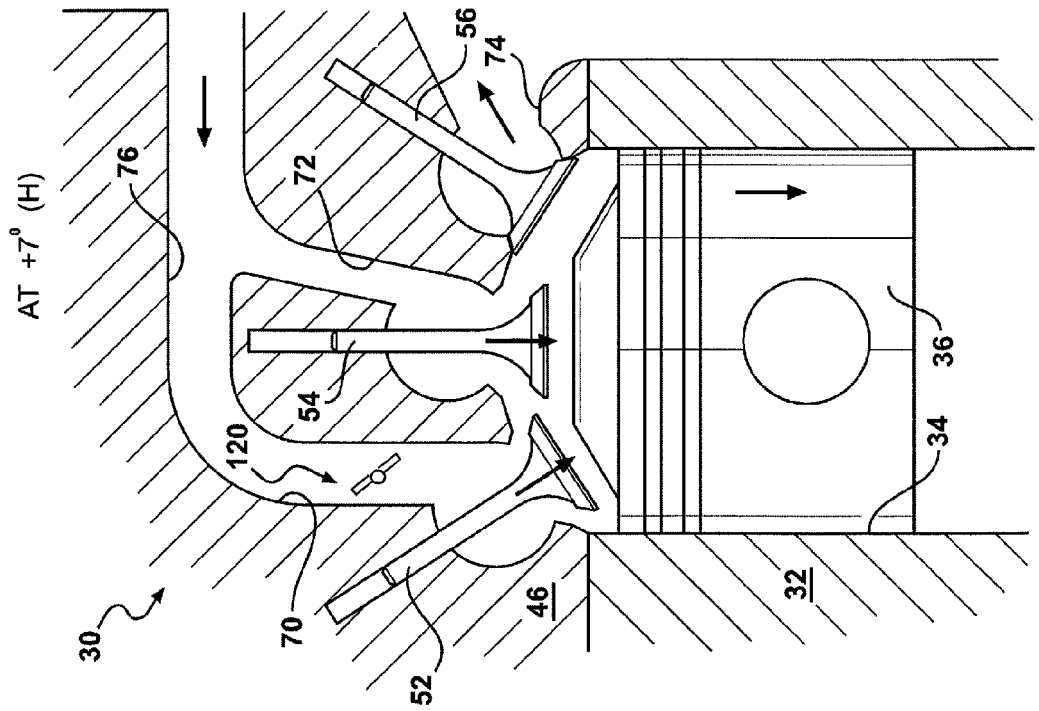

FIG. 13 shows piston 36 during its intake stroke at 7° ATDC (Point H), with normal and auxiliary intake valves 52, 54 continuing to open, and exhaust valve 56 having just contacted its seat 60 and entered its closed state.

Figure 14:
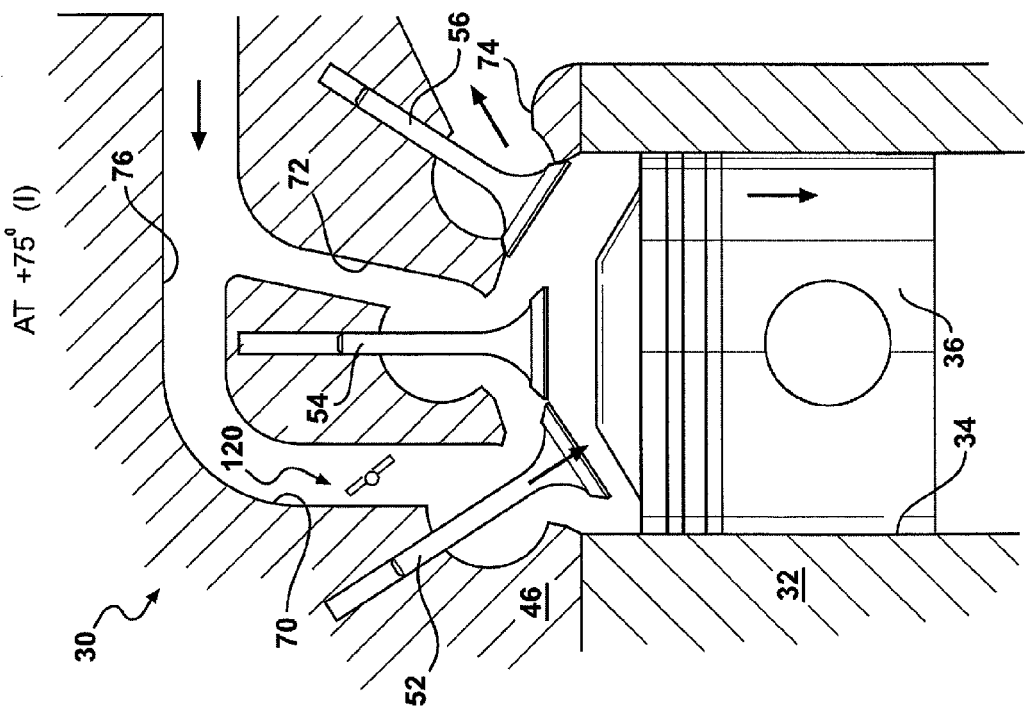

FIG. 14 shows piston 36 during its intake stroke at 75° ATDC (Point I). In FIG. 14, auxiliary intake valve 54 has reached its maximum lift, and normal intake valve 52 continues opening. Exhaust valve 56 is closed.

Figure 15:
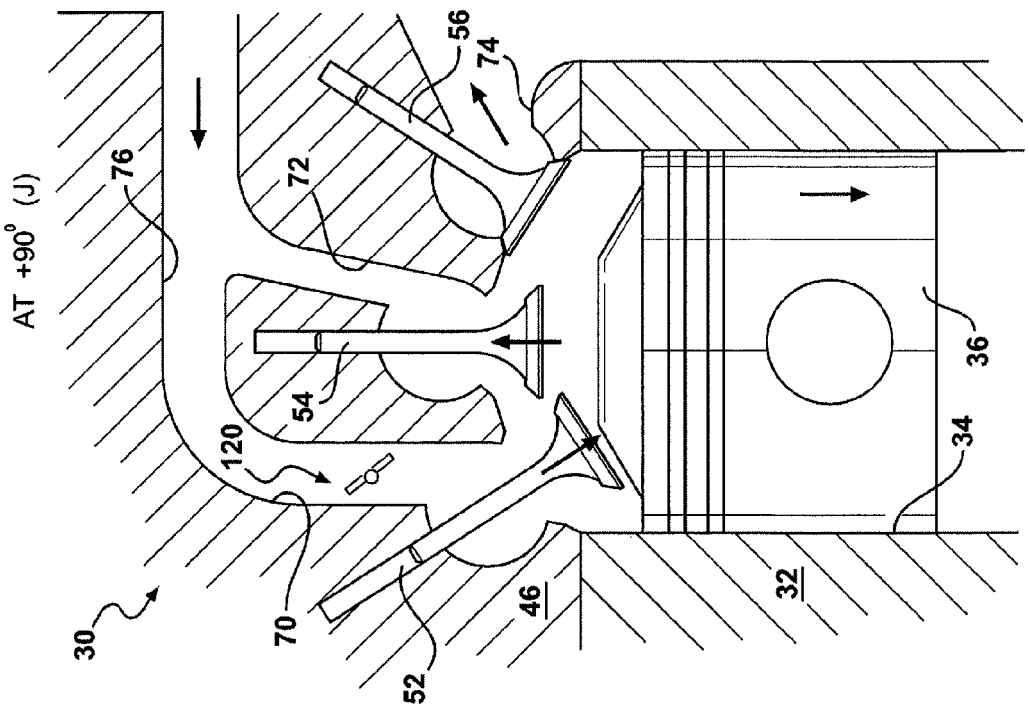

FIG. 15 shows piston 36 during its intake stroke at 90° ATDC (Point J). In FIG. 15, auxiliary intake valve 54 is now moving towards its closed state and normal intake valve 52 continues to open. Exhaust valve 56 remains closed.

Figure 16:
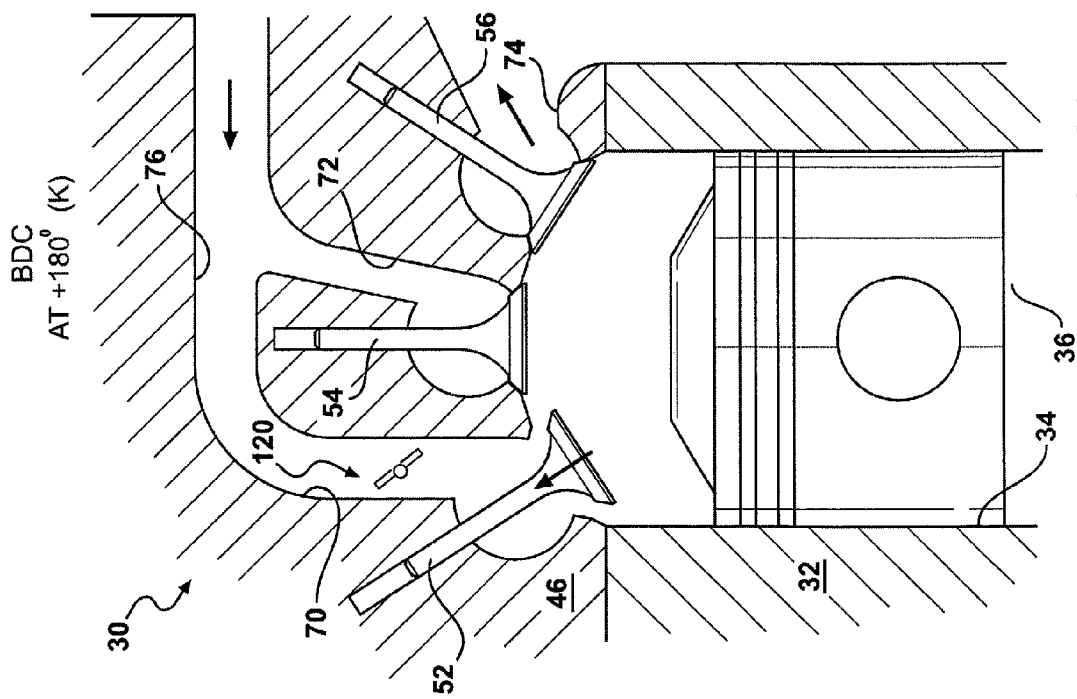

FIG. 16 shows piston 36 at 180° ATDC (Point K), between its intake and compression strokes. In FIG. 16, normal intake valve 52 is closing, and auxiliary intake valve 54 and exhaust valve 56 are closed.

Figure 17:
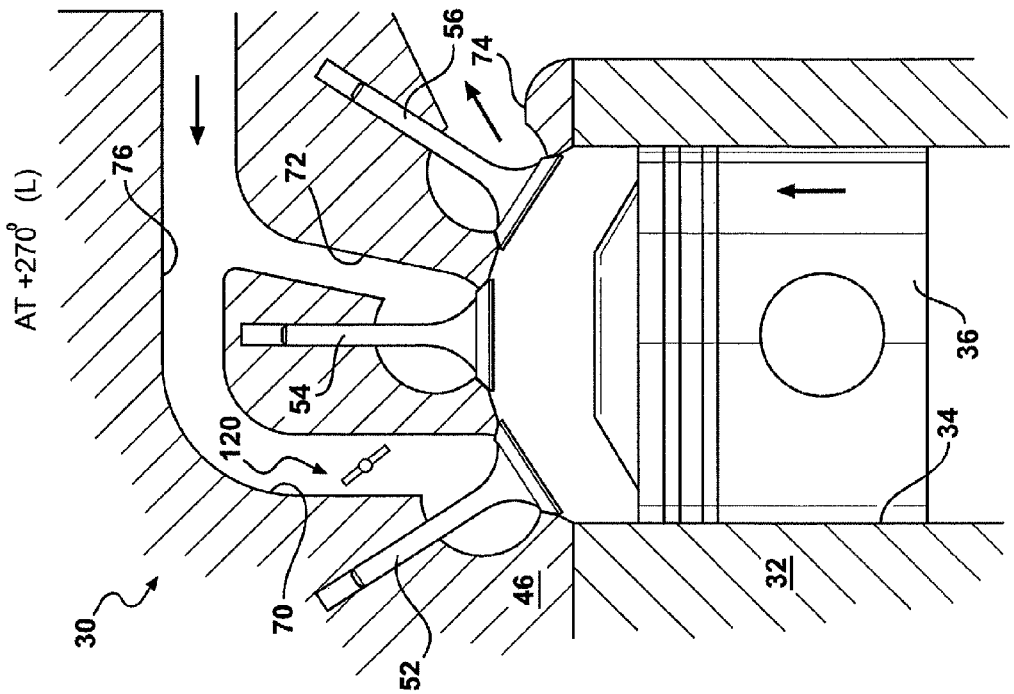

FIG. 17 shows piston 36 during its compression stroke at 270° ATDC (Point L), with all valves 52, 54, and 56 closed.

Referring to FIGS. 11 through 16, during the open states of intake valves 52 and/or 54, with control valve 120 in an open or an intermediate position in which airflow is permitted through runner 70, pressure-boosted air from intake manifold 76 is allowed to enter into combustion chamber 48 via normal intake valve 52.

With control valve 120 in a fully closed position, air is prevented from flowing through runner 70, and all airflow into combustion chamber 48 from intake manifold 76 is via auxiliary intake valve 54. Referring to FIGS. 12 through 16, with control valve 120 in its closed position, normal intake valve 52 is effectively inoperable and airflow from intake manifold 76 does not enter combustion chamber 48 via normal intake valve 52. Air entering combustion chamber 48 via auxiliary intake valve 54 may be introduced into the port 50 associated with normal intake valve 52, and past valve 52, but is prevented from moving beyond closed control valve 120.

Referring to FIG. 16, if valve 120 is open or in an intermediate position, air from intake manifold 76 is permitted to enter combustion chamber 48 via normal intake valve 52, but airflow into combustion chamber 48 through auxiliary intake valve 54 is prevented because auxiliary intake 54 has already entered its closed state. If control valve 120 is in its closed position, the expansion of high pressure air already delivered to combustion chamber 48 will assist in driving piston 36 to BDC at point K shown in FIG. 16.

Figure 18A:
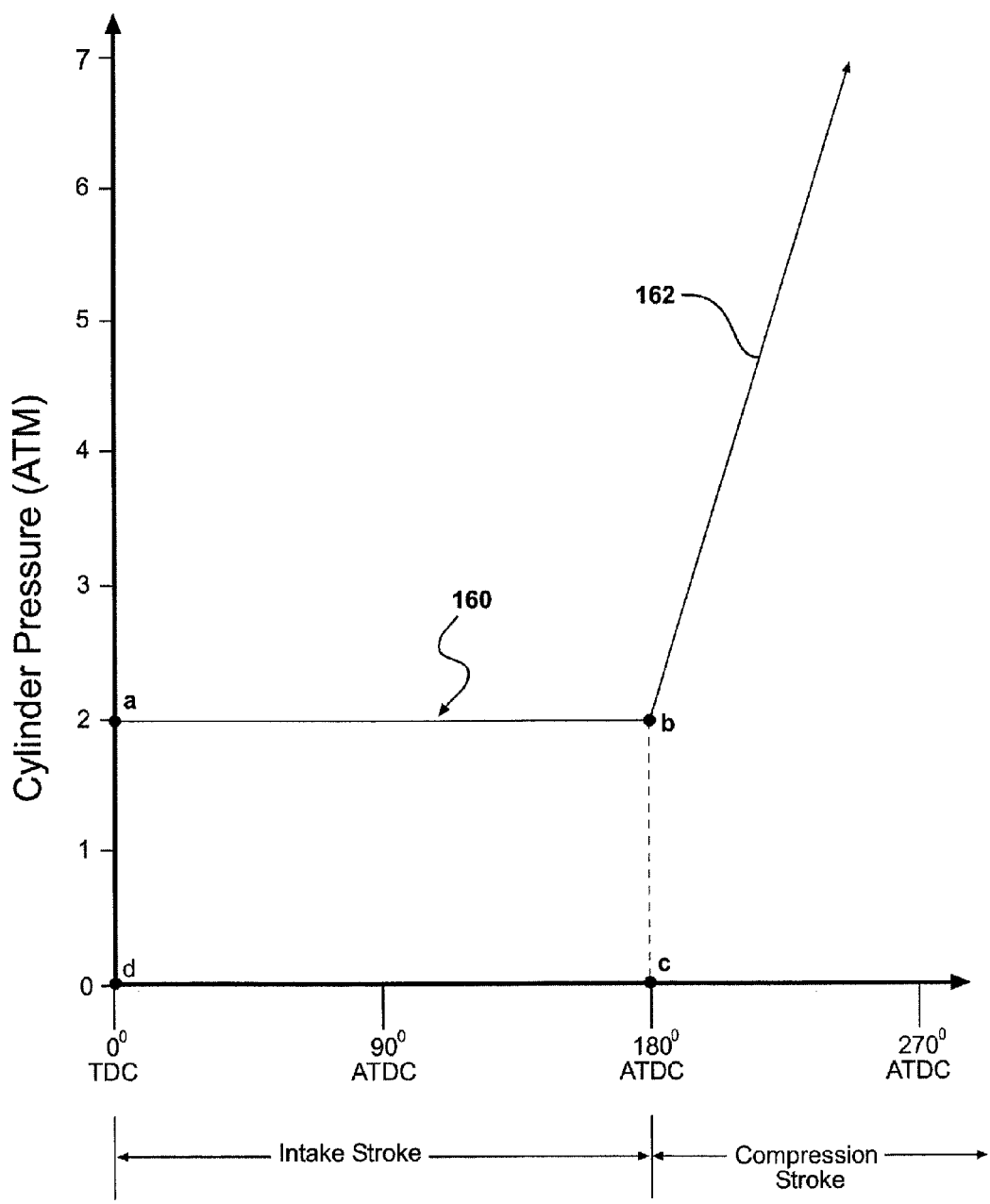
FIG. 18a is a chart indicating the cylinder pressures during the intake stroke and an initial portion of the compression stroke, at a nominal (2 Atm) boost pressure in a prior turbocharged IC engine.

Referring now to FIG. 18a, the cylinder pressures experienced at wide-open-throttle, high engine output conditions in a conventional turbocharged IC engine are shown, in which the air intake pressure is boosted to 2 Atm, a typical level. As one of ordinary skill in the art will understand from the chart, during the piston's intake stroke (i.e., between 0° TDC and 180° ATDC), the expanding volume of the combustion chamber is maintained under a substantially constant pressure equivalent to the boosted intake air level found in the intake manifold. This pressure is represented by line 160, which extends between points a and b. One of ordinary skill in the art will also understand the amount of work performed by the compressed air on the piston during the intake stroke, which effectively provides a power stroke during the intake stroke and forces the piston towards its BDC position, is represented by rectangular area a, b, c, d under line 160. Point b represents the cylinder pressure (and the is substantially proportional to the cylinder's air charge temperature) at the onset of the compression stroke, which raises the cylinder pressure substantially along line 162 to either TDC or the approximate occurrence of ignition, whichever occurs first, somewhere around 360° ATDC. Importantly, the present invention provides a means for reaching substantially these same air charge conditions at point b during high engine output conditions, thereby preventing, despite its having substantially higher comparative intake air boost levels, an undesirably high mass of air being trapped in the cylinder. By bringing the resulting cylinder air charge levels at point b to previously experienced and "normal" or "manageable" level of a prior engine, the preset invention readily lends itself to being easily incorporated into existing multivalve engines. As discussed below, the present invention permits increased amounts of work to be done by its comparatively much higher-pressure intake air on the piston to force it towards its BDC position during the intake stroke, while still reaching a normal cylinder air charge pressure (and temperature) at point b prior to compression.

Figure 18B:
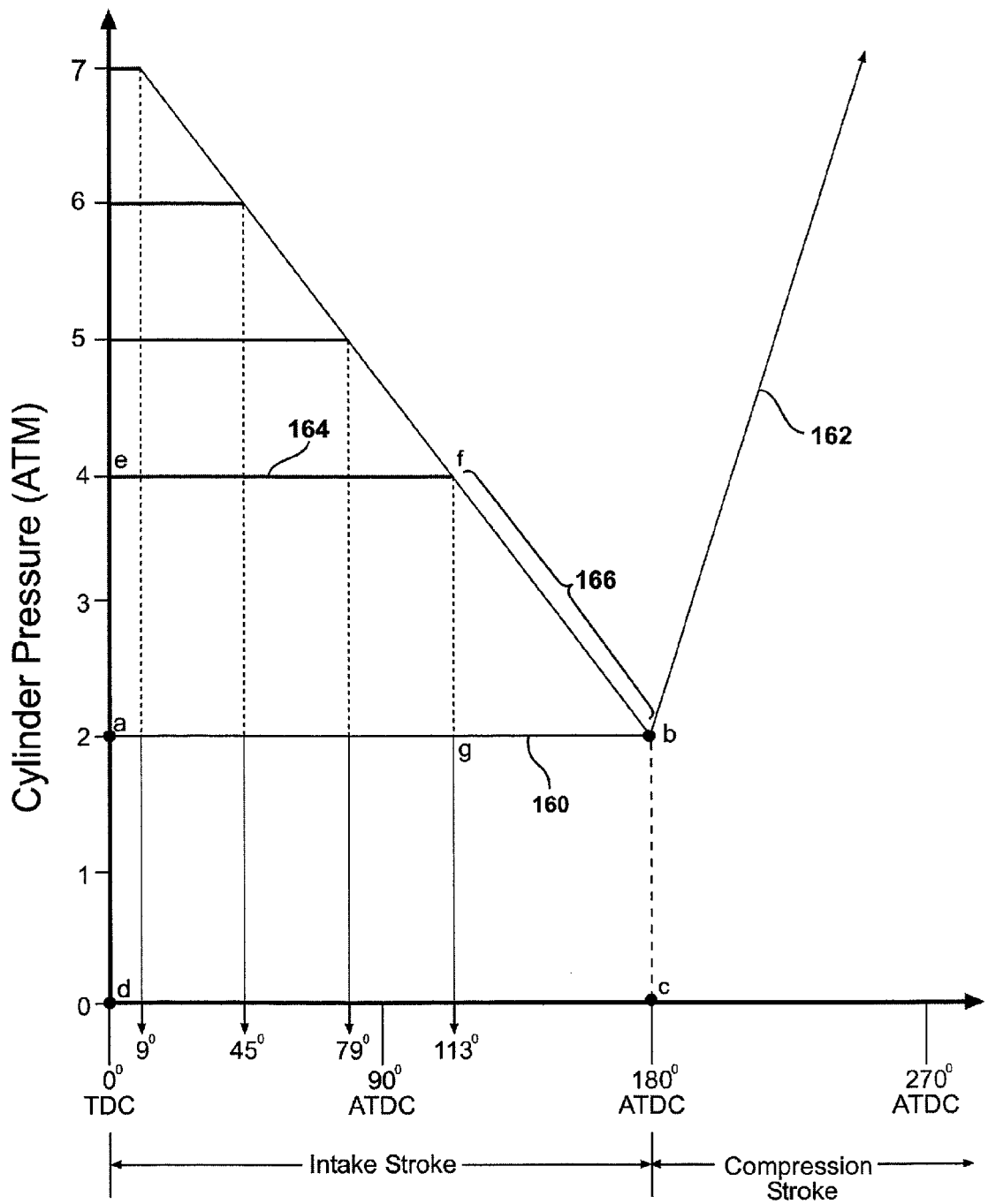
FIG. 18b is a chart similar to FIG. 18a, but comparatively indicating cylinder pressures at various boost pressures substantially above the nominal (2 Atm) boost pressure condition of the prior turbocharged IC engine, when that engine is modified to incorporate the present invention.

Referring to FIG. 18b and the above-mentioned example intake air boost level of 4 Atm at wide-open-throttle conditions (in which incorporated control valve 120 is closed), the cylinder pressure during the initial portion of the intake stroke is likewise at about 4 Atm, and remains at that level (line 164) until 113° ATDC is reached, at which time is closed auxiliary intake valve 54, which could be one of an existing multi-valve engine's two intake valves. The other intake valve of the existing engine may be recast as the normal intake valve 52 of the present invention.

Upon auxiliary valve 54 being seated at 113° ATDC the introduction of pressurized air into the cylinder ceases. Preferably, the duration of lift of auxiliary intake valve 54 is selected (e.g., by redesigning cam lobe 66 of the existing engine) to bring the intake air charge to point b at BDC through continued expansion of the previously introduced boosted air, which acts on the piston, causing the cylinder pressure to drop along line 166 from 113° to 180° ATDC, to point b. As one of ordinary skill in the art will recognize from FIG. 18b, relative to the case of the nominally (2 Atm) boosted engine, the modified engine having a boost level of 4 Atm provides an additional level of work on the piston during its effective power stroke represented by the total of rectangular area a, e, f, g, and triangular area g, f, b. In other words, in an engine embodiment having a boost pressure of 4 Atm, the pumping work on the piston during its intake stroke, which drives it towards BDC, and which is recovered from the exhaust gases through the turbocharger during high engine output conditions, is represented by the area b, c, d, e, f. Comparatively, the pumping work of a prior, otherwise similar engine having a boost pressure of 2 Atm, is represented by the much smaller area a, b, c, d. Importantly, the present invention provides these comparative pumping gains while still arriving at air charge point b at BDC, prior to compression, and follows the same line 162 during the compression stroke.

FIG. 18b also shows similar arrangements for boost levels of 5 Atm, 6 Atm, and 7 Atm, respectively associated with seating auxiliary intake valve 54 at 79°, 45°, and 9° ATDC. At each boost level, the total amount of pumping work done on the piston by the pressurized intake air introduced into the combustion chamber in forcing the piston towards BDC is represented by the total of the respective rectangular and triangular areas above line 160, plus the "baseline" rectangular area a, b, c, d.

The fluid system defined by engine 30 consists of air and exhaust flows through the engine with consideration for the energy balance. The amount of exhaust gas energy that can be extracted will determine the levels of inlet air pressure and volume that can be achieved. At the same time, engine conditions can vary from very low to full loads at any speed within the engine's capability. Consequently, computer analysis of contemplated modifications to yield an engine design according to the present invention would be undertaken. Sophisticated, accurate and user-friendly commercial programs are commercially available to perform such analyses.

As to a further discussion of the manner of usage and operation of the present invention, the same should be apparent from the above description. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An internal combustion engine comprising:
an air intake pressurization device having an outlet from which air at a pressure substantially greater than ambient air pressure is expelled;
an expansible combustion chamber into which air is received from said air intake pressurization device outlet and from which exhaust gases are expelled;
a plurality of fluid flow valves each having open and closed states relative to said combustion chamber and comprising at least first and second intake valves and one or more exhaust valves, said combustion chamber in periodic fluid communication with said air intake pressurization device outlet through at least one of said first and second intake valves, exhaust gases expelled from said combustion chamber via said exhaust valve(s);
a control valve disposed between said first intake valve and said air intake pressurization device outlet, said control valve having an open position in which said air intake pressurization device outlet and said combustion chamber are in fluid communication via said first intake valve in its open state and a closed position in which fluid communication between said air intake pressurization device outlet and said combustion chamber via said first intake valve in its open state is comparatively restricted;
said exhaust valve(s) in its open state when said first and second intake valves are both in their closed states, said first and second intake valves both in their open states when said exhaust valve(s) is in its said closed state, said second intake valve moved from its open state into its closed state substantially prior to movement of said first intake valve from its open state into its closed state;
wherein said first and second intake valves open substantially simultaneously.

2. The internal combustion engine of claim 1, wherein said air intake pressurization device is a turbocharger having a rotatable compressor and a rotatable turbine, said compressor driven by said turbine, said compressor having an inlet into which air is received substantially at a first pressure and an outlet from which air is expelled from said turbocharger substantially at a second pressure higher than the first pressure, said turbine having an inlet in periodic fluid communication with said combustion chamber through said exhaust valve(s) and into which exhaust gases from said combustion chamber are received, said turbine having an outlet from which the exhaust gases are expelled, said turbine rotated by the exhaust gases flowing therethrough, said control valve disposed between said first intake valve and said compressor outlet.

3. The internal combustion engine of claim 2, wherein said turbocharger comprises first and second turbochargers each having a said compressor and a said turbine, each said compressor and turbine having an inlet and an outlet, air substantially at the first pressure received in said first turbocharger compressor inlet, air expelled from said first turbocharger compressor outlet received by said second turbocharger compressor inlet at a third pressure intermediate the first and second pressures, air substantially at the second pressure expelled from said second compressor outlet and wherein said first and second turbocharger turbine inlets are connected in parallel and each receives exhaust gases from said combustion chamber via said exhaust valve(s).

4. The internal combustion engine of claim 2, wherein said turbocharger comprises first and second turbochargers each having a said compressor and a said turbine, each said compressor and turbine having an inlet and an outlet, air substantially at the first pressure received in said first turbocharger compressor inlet, air expelled from said first turbocharger compressor outlet received by said second turbocharger compressor inlet at a third pressure intermediate the first and second pressures, air substantially at the second pressure expelled from said second compressor outlet and wherein said first and second turbocharger turbines are in series connection, exhaust gases from said combustion chamber delivered to said inlet of one of said first and second turbocharger turbines, said turbine outlet of which is connected to said inlet of the other of said first and second turbocharger turbines.

5. The internal combustion engine of claim 1, further comprising an aftercooler downstream of said air intake pressurization device outlet and upstream of at least one of said first and second intake valves.

6. The internal combustion engine of claim 1, wherein said control valve has variable positions intermediate its said open and closed positions.

7. The internal combustion engine of claim 1, wherein said control valve position is controlled separately from the positioning of said first intake valve.

8. The internal combustion engine of claim 7, further comprising a rotatable crankshaft, and wherein said first intake valve and said exhaust valve(s) have respective positions relative to said combustion chamber that are coordinated with the angular position of said crankshaft.

9. The internal combustion engine of claim 8, wherein said second intake valve has positions relative to said combustion chamber that are coordinated with the angular position of said crankshaft.

10. The internal combustion engine of claim 9, further comprising a rotatable camshaft having a plurality of cam lobes, and wherein the positions of each of said plurality of fluid control valves relative to said combustion chamber are coordinated with positions on a respective corresponding cam lobe, each said cam lobe and said crankshaft coordinated as to their respective angular positions.

11. The internal combustion engine of claim 7, wherein said control valve position is modulated.

12. The internal combustion engine of claim 11, wherein said control valve is moved toward its said closed position with increasing engine power.

13. The internal combustion engine of claim 1, further comprising an actuator controllably coupled to said control valve and an engine control unit having sensor inputs indicative of at least one varying engine condition and by which an output signal corresponding to engine power is generated by said engine control unit, said control unit operatively connected to said actuator, said actuator and said control valve positioned correspondingly to said output signal.

14. The internal combustion engine of claim 1, further comprising a rotatable crankshaft and a reciprocating piston connected thereto, said expansible combustion chamber partially defined by said piston, and wherein said second intake valve closes at a crankshaft position in a range corresponding to an intake stroke of said piston.

15. The internal combustion engine of claim 1, wherein with said control valve in its said closed position, substantially no air is delivered from said air intake pressurization device outlet to said combustion chamber via said first intake valve.

16. The internal combustion engine of claim 15, further comprising a rotatable crankshaft and a reciprocating piston connected thereto, said expansible combustion chamber partially defined by said piston, and wherein with said control valve in its said closed position and during an intake stroke of said piston, a portion of the air received into said combustion chamber via said second intake valve may exit said combustion chamber via said first intake valve.

17. The internal combustion engine of claim 15, wherein the quantity of air received into said combustion chamber during the engine intake stroke is comparatively reduced when said control valve is in its said closed position relative to when said control valve is in its said open position.

18. A method for performing the operating cycle of an internal combustion engine comprising the steps of:
supplying intake air at a pressure substantially greater than ambient air pressure to an intake manifold in periodic fluid communication with a combustion chamber;
opening first and second intake valves substantially simultaneously and placing the intake manifold and combustion chamber in fluid communication;
receiving intake air from the intake manifold into the combustion chamber via at least one of the first and second intake valves;
moving a piston partially defining the combustion chamber away from the intake valves during a piston intake stroke while both of the first and second valves are open;
forcing the piston towards a bottom dead center position during at least an initial portion of the piston intake stroke; and
closing the second intake valve during the piston intake stroke and substantially prior to closing the first intake valve.

19. The method of claim 18, further comprising the step of:
restricting the flow of intake air into the combustion chamber via the opened first intake valve; and
wherein said step of receiving intake air from the intake manifold into the combustion chamber via at least one of the first and second intake valves comprises receiving intake air from the intake manifold into the combustion chamber solely via the second intake valve.

20. The method of claim 19, wherein said step of restricting the flow of intake air into the combustion chamber via the opened first intake valve comprises restricting the flow of intake air into the combustion chamber via the first intake valve in response to at least one sensed engine condition indicative of a high engine output.

21. The method of claim 19, wherein said step of restricting the flow of intake air into the combustion chamber via the opened first intake valve comprises taking the intake manifold and the combustion chamber substantially out of fluid communication via the opened first intake valve.

22. The method of claim 18, further comprising the step of:
controlling the opening and closing of both the first and second intake valves through rotation of a camshaft.

23. The method of claim 18, further comprising the steps of:
controlling the opening and closing of the first intake valve through rotation of a camshaft linked to the piston; and
controlling the opening and closing of the second intake valve independently of the first intake valve through an actuator.

24. The method of claim 18, further comprising the step of:
variably restricting the flow of intake air into the combustion chamber via the first intake valve in response to at least one sensed engine condition indicative of changing engine output.

25. The method of claim 18, further comprising the step of:
limiting the quantity of intake air received into the combustion chamber during the piston intake stroke to that received into the combustion chamber via the second intake valve.

26. An internal combustion engine comprising:
an air intake pressurization device having an outlet from which air at a pressure substantially greater than ambient air pressure is expelled;
an expansible combustion chamber into which air is received from said air intake pressurization device outlet and from which exhaust gases are expelled;
a plurality of fluid flow valves each having open and closed states relative to said combustion chamber and comprising at least first and second intake valves and one or more exhaust valves, said combustion chamber in periodic fluid communication with said air intake pressurization device outlet through at least one of said first and second intake valves, exhaust gases expelled from said combustion chamber via said exhaust valve(s);
a control valve disposed between said first intake valve and said air intake pressurization device outlet, said control valve having an open position in which said air intake pressurization device outlet and said combustion chamber are in fluid communication via said first intake valve in its open state and a closed position in which fluid communication between said air intake pressurization device outlet and said combustion chamber via said first intake valve in its open state is comparatively restricted;
said exhaust valve(s) in its open state when said first and second intake valves are both in their closed states, said first and second intake valves both in their open states when said exhaust valve(s) is in its said closed state, said second intake valve moved from its open state into its closed state substantially prior to movement of said first intake valve from its open state into its closed state;
wherein said internal combustion engine is a spark ignition engine and further comprising a variably positioned throttle valve upstream of at least one of said control valve and said second intake valve, the quantity of air received by said combustion chamber varied with the position of said throttle valve.

27. The internal combustion engine of claim 26, wherein said air intake pressurization device is a turbocharger having a rotatable compressor and a rotatable turbine, said compressor driven by said turbine, said compressor having an inlet into which air is received substantially at a first pressure and an outlet from which air is expelled from said turbocharger substantially at a second pressure higher than the first pressure, said turbine having an inlet in periodic fluid communication with said combustion chamber through said exhaust valve(s) and into which exhaust gases from said combustion chamber are received, said turbine having an outlet from which the exhaust gases are expelled, said turbine rotated by the exhaust gases flowing therethrough, said control valve disposed between said first intake valve and said compressor outlet.

28. The internal combustion engine of claim 26, wherein said control valve has variable positions intermediate its said open and closed positions.

29. The internal combustion engine of claim 26, wherein said control valve position is controlled separately from the positioning of said first intake valve.

30. The internal combustion engine of claim 29, further comprising a rotatable crankshaft, and wherein said first intake valve and said exhaust valve(s) have respective positions relative to said combustion chamber that are coordinated with the angular position of said crankshaft.

31. The internal combustion engine of claim 30, wherein said second intake valve has positions relative to said combustion chamber that are coordinated with the angular position of said crankshaft.

32. The internal combustion engine of claim 31, further comprising a rotatable camshaft having a plurality of cam lobes, and wherein the positions of each of said plurality of fluid control valves relative to said combustion chamber are coordinated with positions on a respective corresponding cam lobe, each said cam lobe and said crankshaft coordinated as to their respective angular positions.

33. The internal combustion engine of claim 29, wherein said control valve position is modulated.

34. The internal combustion engine of claim 33, wherein said control valve is moved toward its said closed position with increasing engine power.

35. The internal combustion engine of claim 26, further comprising an actuator controllably coupled to said control valve and an engine control unit having sensor inputs indicative of at least one varying engine condition and by which an output signal corresponding to engine power is generated by said engine control unit, said control unit operatively connected to said actuator, said actuator and said control valve positioned correspondingly to said output signal.

36. The internal combustion engine of claim 26, wherein with said control valve in its said closed position, substantially no air is delivered from said air intake pressurization device outlet to said combustion chamber via said first intake valve.

37. The internal combustion engine of claim 36, further comprising a rotatable crankshaft and a reciprocating piston connected thereto, said expansible combustion chamber partially defined by said piston, and wherein with said control valve in its said closed position and during an intake stroke of said piston, a portion of the air received into said combustion chamber via said second intake valve may exit said combustion chamber via said first intake valve.

38. The internal combustion engine of claim 36, wherein the quantity of air received into said combustion chamber during the engine intake stroke is comparatively reduced when said control valve is in its said closed position relative to when said control valve is in its said open position.

39. An internal combustion engine comprising:
an air intake pressurization device having an outlet from which air at a pressure substantially greater than ambient air pressure is expelled;
an expansible combustion chamber into which air is received from said air intake pressurization device outlet and from which exhaust gases are expelled;
a plurality of fluid flow valves each having open and closed states relative to said combustion chamber and comprising at least first and second intake valves and one or more exhaust valves, said combustion chamber in periodic fluid communication with said air intake pressurization device outlet through at least one of said first and second intake valves, exhaust gases expelled from said combustion chamber via said exhaust valve(s);
a control valve disposed between said first intake valve and said air intake pressurization device outlet, said control valve having an open position in which said air intake pressurization device outlet and said combustion chamber are in fluid communication via said first intake valve in its open state and a closed position in which fluid communication between said air intake pressurization device outlet and said combustion chamber via said first intake valve in its open state is comparatively restricted;
said exhaust valve(s) in its open state when said first and second intake valves are both in their closed states, said first and second intake valves both in their open states when said exhaust valve(s) is in its said closed state, said second intake valve moved from its open state into its closed state substantially prior to movement of said first intake valve from its open state into its closed state;
wherein said control valve position is controlled separately from the positioning of said first intake valve with said control valve position being modulated and said control valve moving toward its said closed position with increasing engine power.

40. The internal combustion engine of claim 39, wherein said control valve has variable positions intermediate its said open and closed positions.

41. The internal combustion engine of claim 39, further comprising an actuator controllably coupled to said control valve and an engine control unit having sensor inputs indicative of at least one varying engine condition and by which an output signal corresponding to engine power is generated by said engine control unit, said control unit operatively connected to said actuator, said actuator and said control valve positioned correspondingly to said output signal.

42. The internal combustion engine of claim 39, wherein said internal combustion engine is a spark ignition engine and further comprising a variably positioned throttle valve upstream of at least one of said control valve and said second intake valve, the quantity of air received by said combustion chamber varied with the position of said throttle valve.

43. An internal combustion engine comprising:
an air intake pressurization device having an outlet from which air at a pressure substantially greater than ambient air pressure is expelled;
an expansible combustion chamber into which air is received from said air intake pressurization device outlet and from which exhaust gases are expelled;
a plurality of fluid flow valves each having open and closed states relative to said combustion chamber and comprising at least first and second intake valves and one or more exhaust valves, said combustion chamber in periodic fluid communication with said air intake pressurization device outlet through at least one of said first and second intake valves, exhaust gases expelled from said combustion chamber via said exhaust valve(s);
a control valve disposed between said first intake valve and said air intake pressurization device outlet, said control valve having an open position in which said air intake pressurization device outlet and said combustion chamber are in fluid communication via said first intake valve in its open state and a closed position in which fluid communication between said air intake pressurization device outlet and said combustion chamber via said first intake valve in its open state is comparatively restricted;
said exhaust valve(s) in its open state when said first and second intake valves are both in their closed states, said first and second intake valves both in their open states when said exhaust valve(s) is in its said closed state, said second intake valve moved from its open state into its closed state substantially prior to movement of said first intake valve from its open state into its closed state; and a rotatable crankshaft and a reciprocating piston connected thereto, said expansible combustion chamber partially defined by said piston, and wherein at least one of said first and second intake valves enters its respective said open state prior to said exhaust valve(s) moving from its said open state to its said closed state, and said second intake valve enters its said closed state at a crankshaft position in a range corresponding to an intake stroke of said piston and substantially prior to said first intake valve entering its said closed state.

44. The internal combustion engine of claim 43, wherein said control valve has variable positions intermediate its said open and closed positions.

45. The internal combustion engine of claim 43, wherein said control valve position is controlled separately from the positioning of said first intake valve.

46. The internal combustion engine of claim 43, wherein said first intake valve and said exhaust valve(s) have respective positions relative to said combustion chamber that are coordinated with the angular position of said crankshaft.

47. The internal combustion engine of claim 46, further comprising a rotatable camshaft having a plurality of cam lobes, and wherein the positions of each of said plurality of fluid control valves relative to said combustion chamber are coordinated with positions on a respective corresponding cam lobe, each said cam lobe and said crankshaft coordinated as to their respective angular positions.

48. The internal combustion engine of claim 43, further comprising an actuator controllably coupled to said control valve and an engine control unit having sensor inputs indicative of at least one varying engine condition and by which an output signal corresponding to engine power is generated by said engine control unit, said control unit operatively connected to said actuator, said actuator and said control valve positioned correspondingly to said output signal.

49. The internal combustion engine of claim 43, wherein said internal combustion engine is a spark ignition engine and further comprising a variably positioned throttle valve upstream of at least one of said control valve and said second intake valve, the quantity of air received by said combustion chamber varied with the position of said throttle valve.

50. The internal combustion engine of claim 43, wherein said first and second intake valves open substantially simultaneously.

51. An internal combustion engine comprising:
an air intake pressurization device having an outlet from which air at a pressure substantially greater than ambient air pressure is expelled;
an expansible combustion chamber into which air is received from said air intake pressurization device outlet and from which exhaust gases are expelled;
a plurality of fluid flow valves each having open and closed states relative to said combustion chamber and comprising at least first and second intake valves and one or more exhaust valves, said combustion chamber in periodic fluid communication with said air intake pressurization device outlet through at least one of said first and second intake valves, exhaust gases expelled from said combustion chamber via said exhaust valve(s);
an actuator controllably coupled to at least one of said valve(s);
an engine control unit having sensor inputs indicative of at least one varying engine condition by which an output signal corresponding to engine power is generated by said engine control unit, said control unit operatively connected to said actuator, said actuator and said valve(s) positioned correspondingly to said output signal;
said exhaust valve(s) in its open state when said first and second intake valves are both in their closed states, said first and second intake valves both in their open states when said exhaust valve(s) is substantially in its said closed state, said second intake valve moved from its open state into its closed state substantially prior to movement of said first intake valve from its open state into its closed state; and
said second intake valve enters its said closed state in a range corresponding to an intake stroke of said piston and substantially prior to said first intake valve entering its said closed state.

52. The internal combustion engine of claim 51, wherein said first and second intake valves open substantially simultaneously.

* * * * *